(12) United States Patent
Hara et al.

(10) Patent No.: US 12,074,542 B2
(45) Date of Patent: Aug. 27, 2024

(54) MOTOR CONTROL DEVICE, ELECTROMECHANICAL INTEGRATED UNIT, AND ELECTRIC VEHICLE SYSTEM

(71) Applicant: HITACHI ASTEMO, LTD., Hitachinaka (JP)

(72) Inventors: Takafumi Hara, Tokyo (JP); Toshiyuki Ajima, Tokyo (JP); Katsuhiro Hoshino, Hitachinaka (JP); Noriyuki Maekawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 237 days.

(21) Appl. No.: 17/641,179

(22) PCT Filed: Aug. 14, 2020

(86) PCT No.: PCT/JP2020/030845
§ 371 (c)(1),
(2) Date: Mar. 8, 2022

(87) PCT Pub. No.: WO2021/049248
PCT Pub. Date: Mar. 18, 2021

(65) Prior Publication Data
US 2022/0345060 A1    Oct. 27, 2022

(30) Foreign Application Priority Data

Sep. 11, 2019   (JP) .................................. 2019-165772

(51) Int. Cl.
*H02P 27/12*       (2006.01)
*H02P 21/16*       (2016.01)
(Continued)

(52) U.S. Cl.
CPC .............. *H02P 21/16* (2016.02); *H02P 21/22* (2016.02); *H02P 27/12* (2013.01); *B60K 1/00* (2013.01);
(Continued)

(58) Field of Classification Search
CPC .......... H02P 21/16; H02P 21/22; H02P 27/12; H02P 2207/05; B60K 1/00; B60K 6/26; B60Y 2200/92; B60Y 2400/604
See application file for complete search history.

(56) References Cited

U.S. PATENT DOCUMENTS 8,547,045 B2 * 10/2013 Wu ........................ H02P 29/662
                                                      318/432
8,552,673 B2 * 10/2013 Wu ........................ H02P 6/085
                                                      318/400.07

(Continued)

FOREIGN PATENT DOCUMENTS

JP    2008-245486 A    10/2008
JP    2009-11028 A     1/2009
(Continued)

OTHER PUBLICATIONS

International Search Report with English translation and Written Opinion issued in corresponding application No. PCT/JP2020/030845 dated Nov. 10, 2020.

*Primary Examiner* — Rina I Duda
(74) *Attorney, Agent, or Firm* — Foley & Lardner LLP

(57) ABSTRACT

Conventionally, there is a problem that switching loss of an inverter increases in a case where a change such as improvement in a switching frequency is involved. The battery voltage E and the torque command T* are input to the first current command generation unit 111. The battery voltage E, the torque command T*, and a voltage utilization rate obtained by dividing a line voltage effective value by a battery voltage (DC voltage) are input to a second current command generation unit 112. A magnet temperature Tmag of a rotor magnet is input to a current command selection unit 113, and a current command output from the first current command generation unit 111 is selected in normal operation, and the second current command generation unit (Continued)

112 is selected in a case where the magnet temperature exceeds a predetermined value. The second current command generation unit 112 is configured not to obtain the voltage utilization rate of 0.3 to 0.4.

17 Claims, 22 Drawing Sheets

(51) Int. Cl.
*H02P 21/22* (2016.01)
*B60K 1/00* (2006.01)
*B60K 6/26* (2007.10)

(52) U.S. Cl.
CPC .............. *B60K 6/26* (2013.01); *B60Y 2200/92* (2013.01); *B60Y 2400/604* (2013.01); *H02P 2207/05* (2013.01)

(56) References Cited

U.S. PATENT DOCUMENTS

| | | | |
|---|---|---|---|
| 2008/0303475 A1* | 12/2008 | Patel | H02P 21/141 |
| | | | 318/634 |
| 2009/0284202 A1 | 11/2009 | Miura | |
| 2010/0164416 A1 | 7/2010 | Yamada | |
| 2015/0015171 A1* | 1/2015 | Nishibata | H02P 21/14 |
| | | | 318/400.15 |
| 2016/0281723 A1* | 9/2016 | Zhang | F24F 11/77 |
| 2017/0349059 A1* | 12/2017 | Xu | H02P 27/08 |

FOREIGN PATENT DOCUMENTS

| | | | |
|---|---|---|---|
| JP | 4292871 B2 | 7/2009 | |
| JP | 2014-128122 A | 7/2014 | |

* cited by examiner

FIG. 3

| BATTERY VOLTAGE E | AC VOLTAGE | ROTATIONAL SPEED | TORQUE COMMAND | dq-AXIS CURRENT COMMAND | ROTOR MAGNET TEMPERATURE |
|---|---|---|---|---|---|
| 420V | CONSTANT | CONSTANT | CONSTANT | CONSTANT | 65°C AS COMPARED TO 280V (THERE IS POSSIBILITY OF DEMAGNETIZATION) |
| 350V | CONSTANT | CONSTANT | CONSTANT | CONSTANT | +33°C AS COMPARED TO 280V |
| 280V | CONSTANT | CONSTANT | CONSTANT | CONSTANT | STANDARD |

MOTOR CONTROL DEVICE, ELECTROMECHANICAL INTEGRATED UNIT, AND ELECTRIC VEHICLE SYSTEM

TECHNICAL FIELD

The present invention relates to a motor control device, an electromechanical integrated unit, and an electric vehicle system.

BACKGROUND ART

A driving motor used for an electric car or a hybrid car is required to have a large output and a high torque response. For this reason, a permanent magnet rotary electric machine (hereinafter, referred to as a motor) including a rare earth sintered magnet retaining strong energy is generally driven by an inverter. The inverter converts a DC voltage from a DC power supply into a line voltage (AC voltage) of an optional voltage and frequency by pulse width modulation (PWM) control, and drives the motor at a variable speed. For example, in a case of considering use in an electric car, a motor is concentrated on a relatively small load side in urban driving, requires high output on a large load side in acceleration at the time of overtaking or merging and traveling on an expressway, and requires large torque at low speed in climbing a steep slope. As described above, in the motor for an electric car, the load of the motor frequently changes according to a traveling state, and a calorific value of the motor also changes, so that the motor continues to change in temperature. Then, when a magnet temperature of the motor is high and energization is performed with a predetermined amount or more of weak magnetic flux current, irreversible demagnetization in which the permanent magnet does not generate the original magnetic flux occurs. In a case of an electric car provided with only one motor control device, when a motor mounted on the motor control device is demagnetized, it is difficult to control traveling.

PTL 1 proposes a motor drive system that increases a switching frequency of an inverter when a temperature of a permanent magnet of a motor becomes high and reduces a harmonic voltage and a current ripple caused by the switching frequency. In this manner, by improving the switching frequency, the harmonic voltage and the current are reduced, and eddy current loss and hysteresis loss are reduced.

CITATION LIST

Patent Literature

PTL 1: JP 2009-11028 A

SUMMARY OF INVENTION

Technical Problem

In the technique described in PTL 1, there is a problem that switching loss of an inverter increases in a case where a change such as improvement in a switching frequency is involved.

Solution to Problem

A motor control device according to the present invention is a motor control device that is connected to a power converter that converts a DC voltage into an AC voltage having a three-phase to drive a three-phase synchronous motor, and controls driving of the three-phase synchronous motor by outputting a pulse width modulation signal to the power converter. A d-axis current in the three-phase synchronous motor is controlled based on a ratio of the AC voltage to the DC voltage in a case where a magnet temperature of a rotor of the three-phase synchronous motor exceeds a predetermined temperature.

The motor control device according to the present invention is a motor control device that is connected to a power converter that converts a DC voltage into an AC voltage having a three-phase to drive a three-phase synchronous motor, and controls driving of the three-phase synchronous motor by outputting a pulse width modulation signal to the power converter. A magnet temperature of a rotor of the three-phase synchronous motor, a coil temperature of a stator of the three-phase synchronous motor, and a module temperature of the power converter are acquired, and at least one of a current flowing through the three-phase synchronous motor and a switching frequency of the power converter is changed in a case where at least one of the acquired magnet temperature, coil temperature, and module temperature exceeds a predetermined temperature set to each thereof in advance.

The motor control device according to the present invention is a motor control device that is connected to a power converter that converts a DC voltage into an AC voltage having a three-phase to drive a three-phase synchronous motor, and controls driving of the three-phase synchronous motor by outputting a pulse width modulation signal to the power converter. The AC voltage is changed based on a ratio of the AC voltage to the DC voltage in a case where a magnet temperature of a rotor of the three-phase synchronous motor exceeds a predetermined temperature.

Advantageous Effects of Invention

According to the present invention, it is possible to improve output of a motor while reducing eddy current loss of a magnet installed in the motor and avoiding irreversible demagnetization of the magnet.

BRIEF DESCRIPTION OF DRAWINGS

FIG. 3 is a table illustrating a relationship between a battery voltage and a rotor magnet temperature when a motor is driven at a continuous rating.

DESCRIPTION OF EMBODIMENTS

First Embodiment

Figure 1:
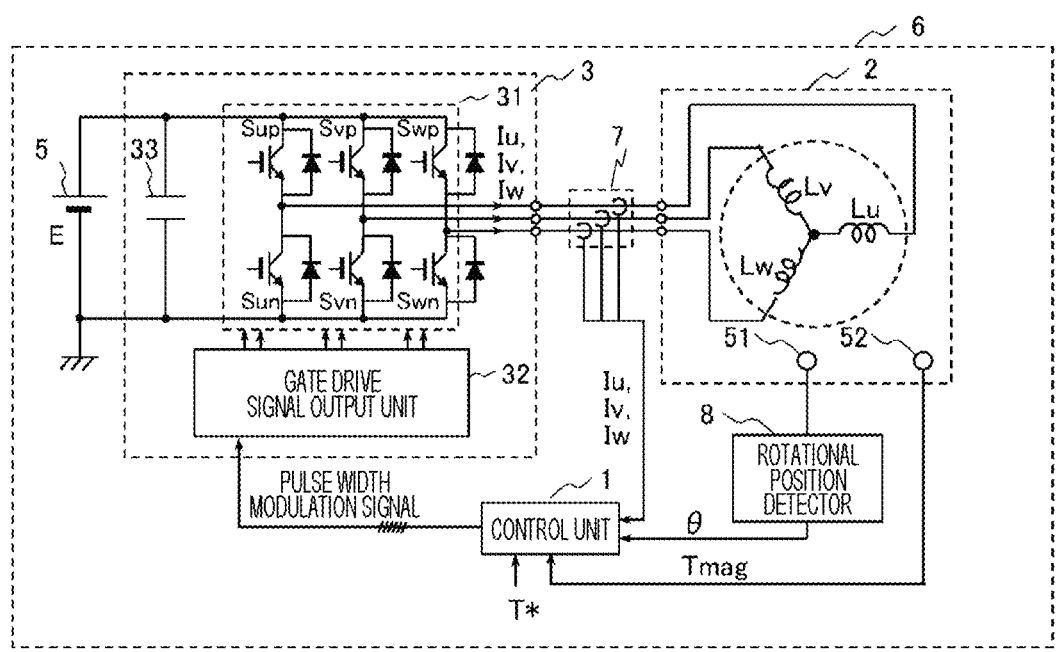
FIG. 1 is a configuration diagram of a motor control device according to a first embodiment.

FIG. 1 is a configuration diagram of a motor drive device 6 including a motor control device according to the present embodiment.

The motor drive device 6 includes a control unit 1, a motor 2, an inverter 3, a high-voltage battery 5, a current detection unit 7, and a rotational position detector 8.

To the control unit 1, a rotational position 9 of the motor 2 is input from the rotational position detector 8 and a magnet temperature Tmag is input from the motor 2, and three-phase AC currents Iu, Iv, and Iw are input from the current detection unit 7 and a torque command T* is input from a host control device (not illustrated). The control unit 1 generates a pulse width modulation signal on the basis of the input information and outputs the pulse width modulation signal to the inverter 3. In this manner, operation of the inverter 3 is controlled, and driving of the motor 2 is controlled.

The inverter 3 includes an inverter circuit 31 that mutually converts a DC voltage into an AC voltage using switching elements Sup, Sun, Svp, Svn, Swp, and Swn, a gate drive signal output unit 32 that outputs a gate drive signal to the inverter circuit 31 based on a pulse width modulation signal input from the control unit 1, and a smoothing capacitor 33 that smooths DC power. The inverter 3 is a power converter that mutually converts a DC voltage into an AC voltage.

The high-voltage battery 5 is a DC voltage source of the motor drive device 6, and its voltage greatly fluctuates according to a charge state. A battery voltage E of the high-voltage battery 5 is converted into a pulsed three-phase AC voltage having a variable voltage and a variable frequency by the inverter circuit 31 and the gate drive signal output unit 32 of the inverter 3, and is applied to the motor 2 as a line voltage.

The motor 2 is a three-phase synchronous motor rotationally driven by supply of a line voltage (three-phase AC voltage) from the inverter 3. The motor 2 is, for example, a permanent magnet rotary electric machine, and a permanent magnet such as a neodymium magnet is installed on a rotor as a rotor magnet. A rotational position sensor 51 is attached to the motor 2 in order to control a phase of an applied voltage of three-phase AC in accordance with a phase of an induced voltage of the motor 2. The rotational position detector 8 calculates the rotational position θ of a rotor from an input signal of the rotational position sensor 51 and calculates a motor rotational speed ωr. Here, a resolver including an iron core and a winding is more suitable as the rotational position sensor 51. However, a sensor including a magnetoresistive element or a Hall element, such as a GMR sensor, may be used. Further, the rotational position θ may be estimated using a three-phase current or a three-phase voltage of the motor 2.

The motor 2 is provided with a temperature sensor 52 that detects the magnet temperature Tmag of a rotor magnet from the viewpoint of suppressing demagnetization of the rotor magnet of the motor 2. Note that a magnet temperature estimation unit may be provided so that the magnet temperature Tmag of the rotor magnet is estimated using the temperature dependency of an induced voltage induced by the rotation of the motor 2, or estimation may be performed using a thermal network.

Hereinafter, an example of a method of estimating a magnet temperature of the rotor magnet will be described using Equations (1) to (3). Equations (1) and (2) represent a dq-axis voltage equation of the motor. In Equation (1) and Equation (2), a winding resistance R, an electrical angular frequency ω, and dq-axis inductances Ld and Lq can be regarded as being substantially unchanged with respect to the temperature. In contrast, although dq-axis voltages Vd and Vq and dq-axis currents Id and Iq are fluctuation parameters, the dq-axis current can be derived from a three-phase current of the motor using a rotor position, and the dq-axis voltage can be derived by calculation from a voltage command value.

$$Vd = R*Id - \omega*Lq*Iq \quad (1)$$

$$Vq = *iq + \omega*Ld*Id + \omega*Ke \quad (2)$$

Here, Vd and Vq are dq-axis voltages, Id and Iq are dq-axis currents, Ld and Lq are dq-axis inductances, ω is an electrical angular frequency, Ke is an induced voltage constant, and R is a winding resistance.

Equation (3) shows the temperature dependency of the induced voltage on a rotor magnet temperature. It can be seen that when a temperature varies from a normal temperature T_nomi, the induced voltage varies linearly accordingly.

$$Ke = Ke\_nomi + (T - T\_nomi)*K \quad (3)$$

Here, Ke_nomi is an induced voltage constant at a normal temperature, T is a rotor temperature, T_nomi is a normal temperature of the rotor, and K is a temperature dependency slope of the induced voltage.

Next, a detection principle of a rotor magnet temperature will be described. In the equation of the q-axis voltage of Equation (1) and Equation (2), the induced voltage constant Ke is derived from a known parameter. This induced voltage constant Ke does not coincide with the induced voltage constant Ke_nomi at a normal temperature due to temperature dependency. In Equation (3), the induced voltage constant Ke_nomi at a normal temperature and the normal temperature T_nomi of the rotor are known, and the rotor temperature T can be estimated using these and the induced voltage constant Ke.

The current detection unit 7 detects the U-phase AC current Iu, the V-phase AC current iv, and the W-phase AC current Iw, which are three-phase AC currents for energizing the motor 2. Although one including three current detectors is illustrated here, the number of current detectors may be two, and the remaining one phase may be calculated from the fact that the sum of three-phase currents is zero. Further, a pulsed DC bus current flowing into the inverter 3 may be detected as a voltage one both ends of a shunt resistor inserted between the smoothing capacitor 33 and the inverter 3, and a DC current may be reproduced as a three-phase current according to an applied voltage.

Figure 2:
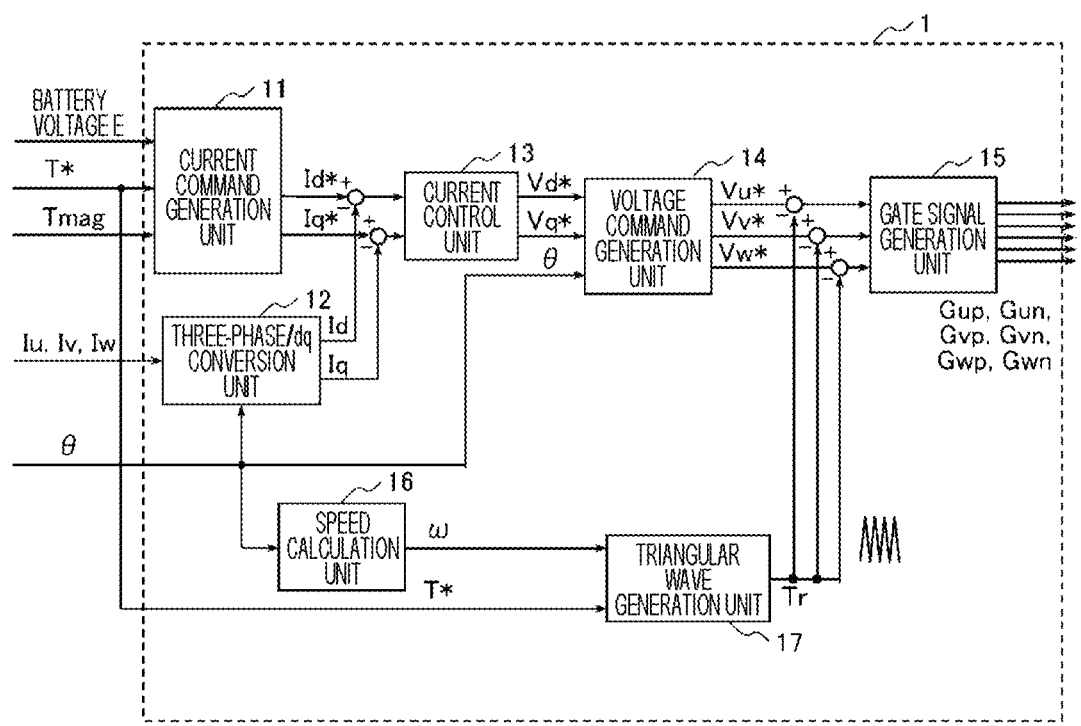
FIG. 2 is a block configuration diagram of a control unit.
Figure 4:
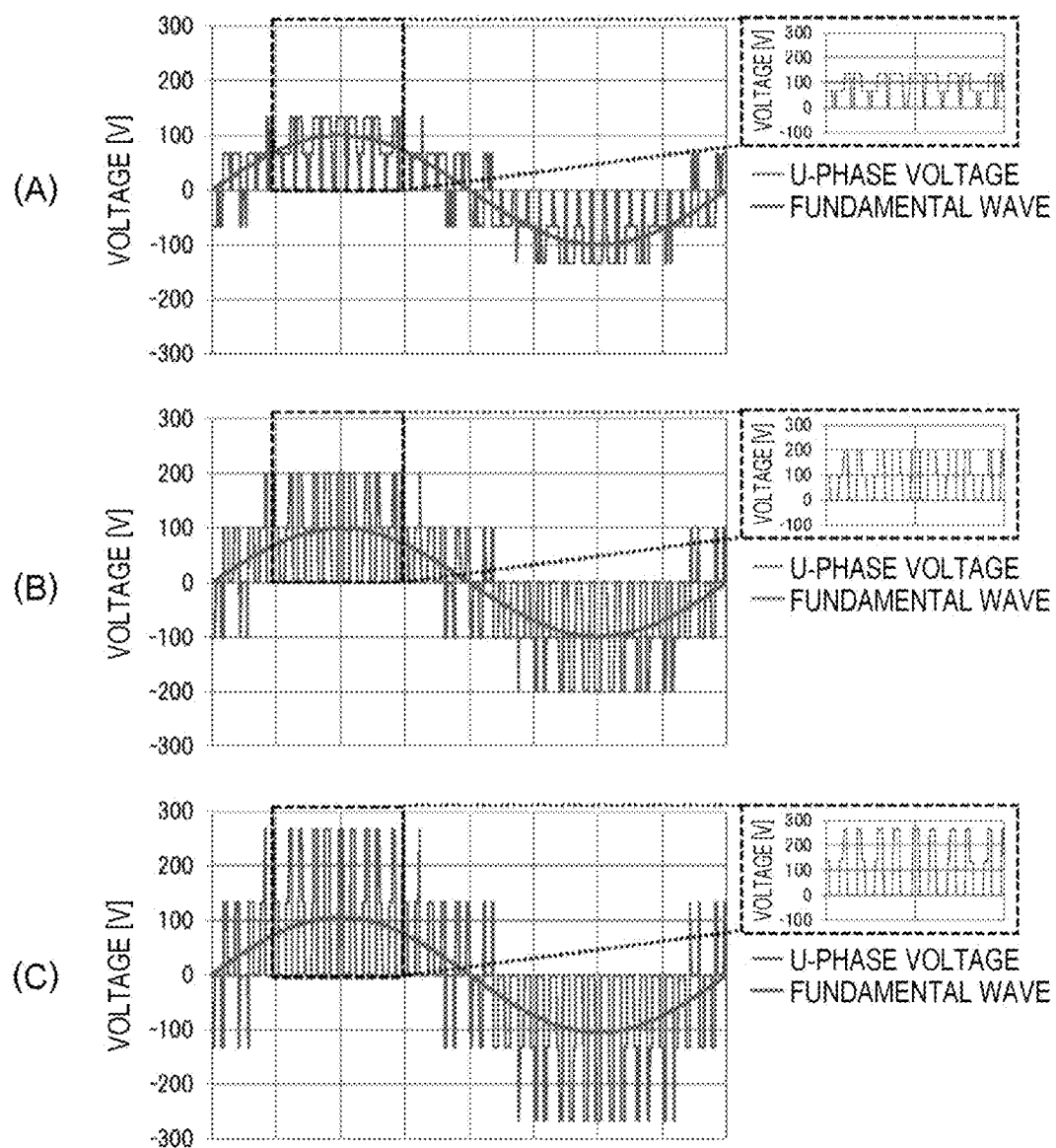
FIG. 4 is a graph illustrating a U-phase voltage and a fundamental wave component when a battery voltage is set to 200 V, 300 V, and 400 V.

FIG. 2 is a block configuration diagram of the control unit 1 illustrated in FIG. 1. As illustrated in FIG. 2, the control unit 1 includes a current command generation unit 11, a three-phase/dq conversion unit 12, a current control unit 13, a voltage command generation unit 14, a gate signal generation unit 15, a speed calculation unit 16, and a triangular wave generation unit 17. The control unit 1 drives the inverter circuit 31 of the inverter 3 in accordance with the d-axis current command Id* and the q-axis current command Iq* corresponding to the detected U-phase AC current Iu, V-phase AC current Iv, W-phase AC current 1w, and torque command T*.

Based on the torque command T* and the battery voltage E, the current command generation unit 11 determines the d-axis current command Id* and the q-axis current command 1q* by using a relational expression or a map of the d-axis current value Id, the q-axis current value Iq, and the motor torque. The three-phase/dq conversion unit 12 performs dq conversion of the detected U-phase AC current Iu, V-phase AC current Iv, and W-phase AC current Iw on the basis of the rotational position θ to calculate the d-axis current value Id and the q-axis current value Iq in the motor 2.

The current control unit 13 calculates a d-axis voltage command Vd* and a q-axis voltage command Vq* so that the d-axis current value Id and the d-axis current command Id* and the q-axis current value Iq and the q-axis current command Iq* match each other.

The voltage command generation unit 14 calculates and outputs a U-phase voltage command value Vu*, a V-phase voltage command value Vv*, and a W-phase voltage command value Vw*, which are three-phase voltage command values obtained by UVW-converting the d-axis voltage command Vd* and the q-axis voltage command Vq* based on the rotational position θ.

The gate signal generation unit 15 compares the U-phase voltage command value Vu*, the V-phase voltage command value Vv*, and the W-phase voltage command value Vw*, which are outputs of the voltage command generation unit 14, with a triangular wave (carrier wave), which is an output of the triangular wave generation unit 17, and generates a pulse width modulation signal, which is a pulsed voltage.

At that time, gate signals Gup, Gvp, and Gwp of an upper arm are generated based on the U-phase voltage command value Vu*, the V-phase voltage command value Vv*, and the W-phase voltage command value Vw*, and the gate signals Gup, Gvp, and Gwp are logically inverted to generate the lower arm gate signals Gun, Gvn, and Gwn. Then, each of the generated gate signals Gup, Gvp, Gwp, Gun, Gvn, and Gwn is output to the inverter 3 as a pulse width modulation signal. The speed calculation unit 16 calculates an electrical angular frequency ωr from a temporal change of the rotational position θ.

Next, before describing the current command generation unit 11 which is a feature of the present embodiment, the background leading to the present embodiment will be described. FIG. 3 is a table illustrating a relationship between the battery voltage E and a rotor magnet temperature when a motor is driven at a continuous rating.

As illustrated in FIG. 3, an AC voltage, a rotational speed of the motor 2, a torque command, a dq-axis current command, and the like are the same. However, the battery voltage E varies as 280V, 3507, and 420V. As can be seen from FIG. 3, the rotor magnet temperature varies greatly depending on the battery voltage E, and varies by up to 65° C. Since the current conditions and the like are the same, a stator temperature on the stator side hardly changes. The background leading to the present embodiment is due to a wide voltage range of the battery voltage E from 2007 to 4007, which is an event unique to automobile use of the motor 2.

Next, a reason why the magnet temperature changes depending on the battery voltage will be described with reference to FIGS. 4 to 7 and Equation (1) and Equation (2) described above. Equations (1) and (2) are voltage equations of a permanent magnet synchronous motor used in an automobile application in a steady state.

Equation (1) and Equation (2) show that, in a case where the rotational speed of the motor 2 and the dq-axis current commands Id* and Iq* determined by the current command generation unit 11 according to the torque command T* are the same and only the battery voltage E is different, the line voltage (three-phase AC voltage) output from the inverter 3 to the motor 2 does not change.

In contrast, a voltage utilization rate obtained by dividing a line voltage effective value by the battery voltage E (DC voltage) greatly changes depending on the battery voltage E. Equation (4) shows a definitional equation of the voltage utilization rate. The voltage utilization rate defined by Equation (4) represents a ratio of a line voltage of the motor 2 to the battery voltage E, that is, a ratio of a converted AC voltage to a DC voltage before being converted into an AC voltage by the inverter 3.

$$\text{Voltage utilization rate} = (\text{line voltage effective value})/(\text{DC voltage}) \quad (4)$$

Equation (5) shows a definitional equation of the line voltage effective value used in Equation (4).

$$\text{Line voltage effective value} = \sqrt{(3/2)} * \sqrt{(Vd^2 Vq^2)} \quad (5)$$

Here, Vd and Vq are dq-axis voltages (relative conversion).

FIGS. 4(A) to 4(C) are graphs illustrating a U-phase voltage and a fundamental wave component when the battery voltage E is set to 200V, 300V, and 400V. FIG. 4(A) illustrates a U-phase voltage and a fundamental wave component in a case where the battery voltage E is 200 V and the voltage utilization rate is 0.61. FIG. 4(B) illustrates a U-phase voltage and a fundamental wave component in a case where the battery voltage E is 300 V and the voltage utilization rate is 0.41. FIG. 4(C) illustrates a U-phase voltage and a fundamental wave component in a case where the battery voltage E is 400 V and the voltage utilization rate is 0.31.

Although the fundamental wave component (thick line) is not changed in FIGS. 4(A) to 4(C), a peak value and a pitch width of the pulse voltage are changed. While FIG. 4(A)

shows a large pitch width and a small peak value, FIG. 4(C) shows a small pitch width and a large peak value.

Figure 5:
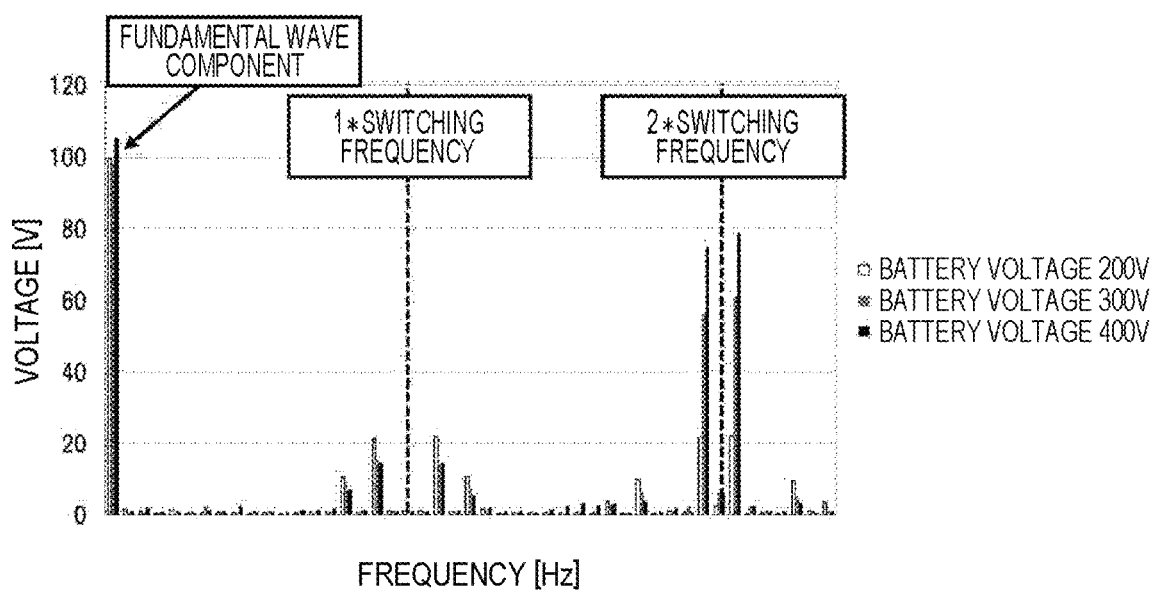
FIG. 5 is a graph illustrating a ripple amplitude of a harmonic component of a line voltage output from an inverter.

FIG. 5 is a graph illustrating a ripple amplitude of a harmonic component of the line voltage output from the inverter 3. The horizontal axis represents frequency, and the vertical axis represents voltage.

When the peak value and the pitch width of the pulse voltage are different, the ripple amplitude of the harmonic component of the line voltage output from the inverter 3 changes as illustrated in FIG. 5. In FIG. 5, as a representative example, a one time component and a two times component of a switching frequency when each switching element of the inverter circuit 31 performs the switching operation are illustrated. However, other than these, multiple components of 3, 4, 5, 6, . . . are generated. Note that the switching frequency corresponds to a frequency of the carrier wave generated by the triangular wave generation unit 17 in the control unit 1. In the present embodiment, attention is paid to the fact that the ripple amplitude of the harmonic voltage changes depending on the voltage utilization rate, and the fact that the ripple amplitude greatly contributes to the eddy current loss of the magnet is used.

Figure 6:
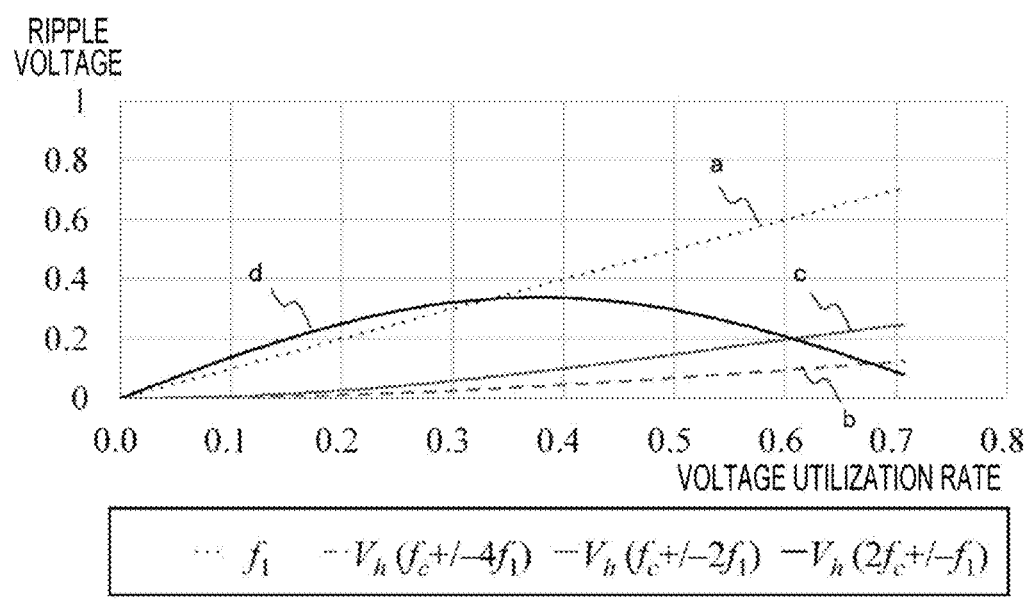
FIG. 6 is a graph illustrating a ripple amplitude that changes depending on a harmonic voltage.

FIG. 6 is a graph illustrating a ripple amplitude that changes depending on a harmonic voltage. The horizontal axis represents the voltage utilization rate, and the vertical axis represents the ripple voltage.

A graph a in FIG. 6 illustrates a motor fundamental frequency f1, a graph b illustrates Vh (fc+/−4f1), a graph c illustrates Vh (fc+/−2f1), and a graph d illustrates Vh (2fc+/−f1). Here, fc represents a switching frequency (frequency of a carrier wave), and Vh represents a harmonic voltage.

As can be seen from FIG. 6, the component (2fc+/−f1) that is twice the switching frequency indicated by the graph d of a thick line is maximized with a maximum voltage utilization rate between 0.3 to 0.4.

Next, a generation principle of eddy current loss of the magnet will be described. The eddy current loss of the magnet is Joule heat generated by eddy current flowing due to an induced electromotive force generated inside a material by fluctuation of a magnetizing force due to application of voltage. Eddy current loss We is expressed by Equation (6) below.

$$We \propto B^2 \ast f^2 \quad (6)$$

Here, B is maximum magnetic flux density, and f is a frequency.

Equation (6) shows that the eddy current loss is dominated by the square of a change amount of magnetic flux density and the square of the frequency. Therefore, reduction in the component twice the switching frequency that is dominant in the square of the frequency has a great effect on reduction of the eddy current loss.

Figure 7:
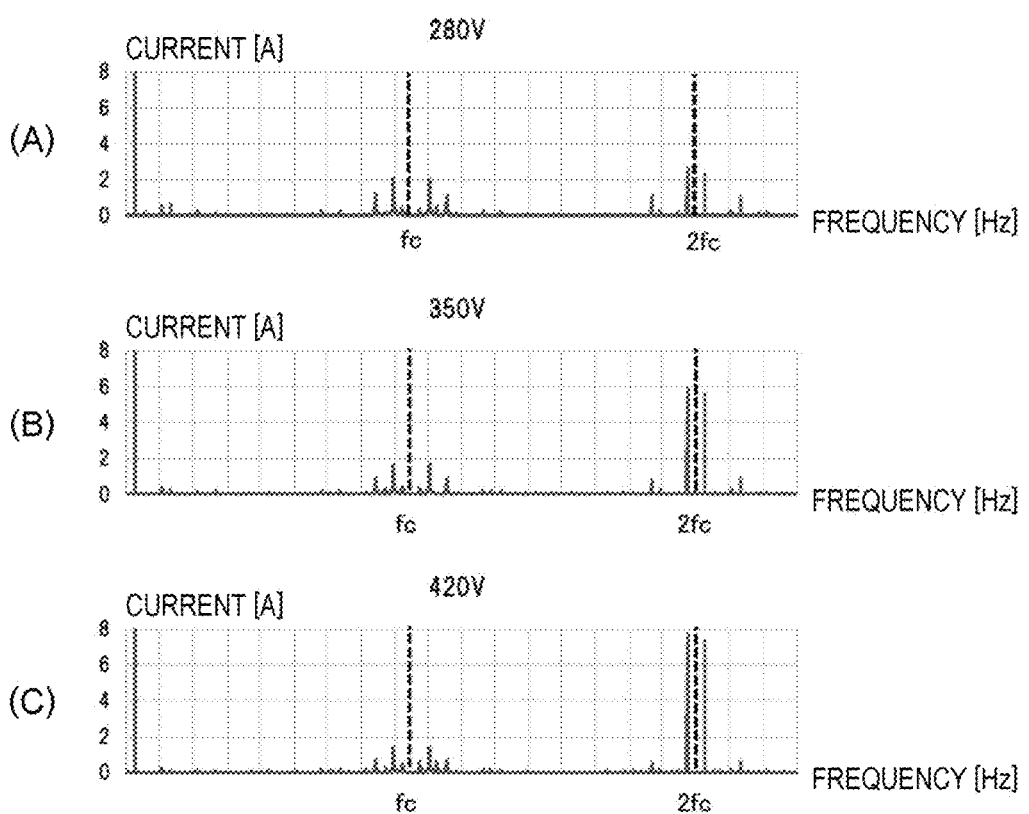
FIG. 7 is a graph illustrating a frequency analysis result of a three-phase current waveform.

FIG. 7 is a graph illustrating a frequency analysis result of a three-phase current waveform. FIG. 7 illustrates a result of calculating a three-phase current waveform by numerical analysis under the condition illustrated in FIG. 3 and performing frequency analysis. FIG. 7(A) illustrates a case where the battery voltage E is 280 V, FIG. 7(B) illustrates a case where the battery voltage E is 350 V, and FIG. 7(C) illustrates a case where the battery voltage E is 420 V. The horizontal axis represents the switching frequency fc, and the vertical axis represents the current.

As shown in FIG. 7(C), in a case where the battery voltage E is 420 V, since the voltage utilization rate is between 0.3 to 0.4, it has been found for the first time that the two times component of the switching frequency is large, which leads to an increase in the magnet temperature shown in FIG. 3.

Due to the background described above, in the present embodiment, driving is performed using a current command calculated in advance to avoid the voltage utilization rate of 0.3 to 0.4, separately from a current command of maximum torque/current control (MTPA Control: Maximum torque per ampere control) that is usually used. Hereinafter, the present embodiment will be described in detail.

Figure 8:
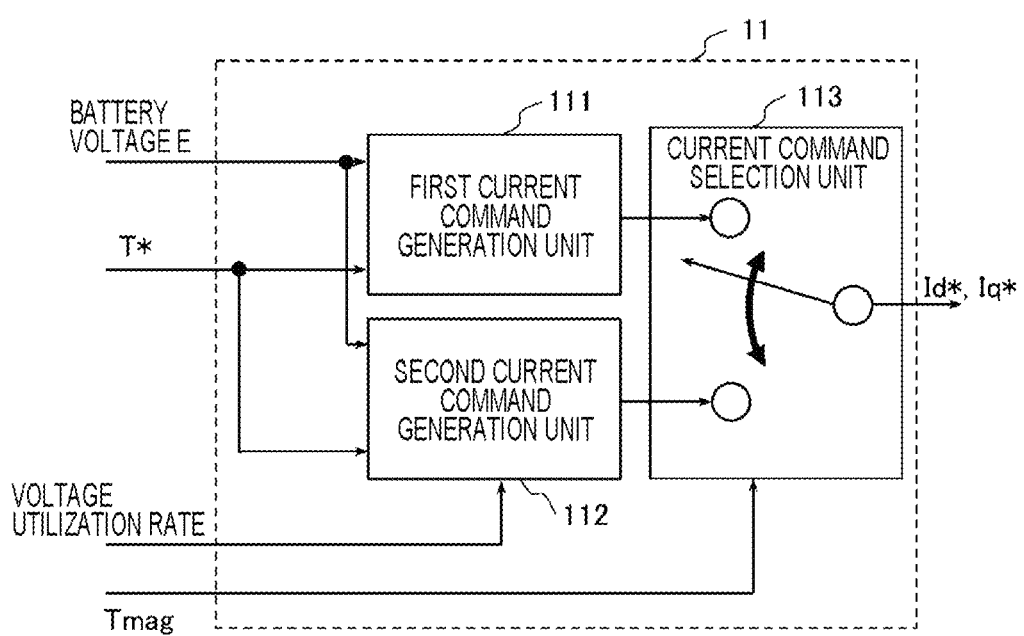
FIG. 8 is a block diagram of a current command generation unit.

FIG. 8 is a block diagram of the current command generation unit 11.

The current command generation unit 11 includes a first current command generation unit 111 for normal operation, a second current command generation unit 112 for magnet temperature reduction, and a current command selection unit 113. The battery voltage E and the torque command T* are input to the first current command generation unit 111. The battery voltage E, the torque command T*, and the voltage utilization rate calculated by the control unit 1 based on Equation (4) are input to the second current command generation unit 112. The magnet temperature Tmag of the rotor magnet is input to the current command selection unit 113. The current command selection unit 113 selects a current command output from the first current command generation unit 111 in normal operation in which the magnet temperature Tmag is less than a predetermined value, and selects a current command output from the second current command generation unit 112 in a case where the magnet temperature Tmag exceeds the predetermined value. The second current command generation unit 112 generates a current command as described later so as not to obtain the voltage utilization rate of 0.3 to 0.4. Note that a range of the voltage utilization rate that does not become the voltage utilization rate of 0.3 to 0.4 may be freely changed as long as the range is not a range in which the rotor magnet temperature greatly increases due to the two times component of the switching frequency.

Next, generation of a current command in the second current command generation unit 112 will be described. Equation (7) represents a torque equation of the motor, and Equation (8) represents an absolute current value. The target of the present embodiment is an embedded permanent magnet motor capable of utilizing reluctance torque generated by a salient pole ratio which is a difference between a d-axis inductance and a q-axis inductance. For this reason, there are a plurality of the d-axis currents Id and the q-axis currents Iq with respect to the torque T due to two variables.

$$T = p \ast Ke \ast Iq + p \ast (Ld-Lq) \ast Id \ast Iq \quad (7)$$

$$|I| = \sqrt{(Id^2 + Iq^2)} \quad (8)$$

Here, Id and Iq are dq-axis currents, |I| is an absolute current value, Ld and Lq are dq-axis inductances, p is the number of pole pairs, and Ke is an induced voltage constant.

Figure 9:
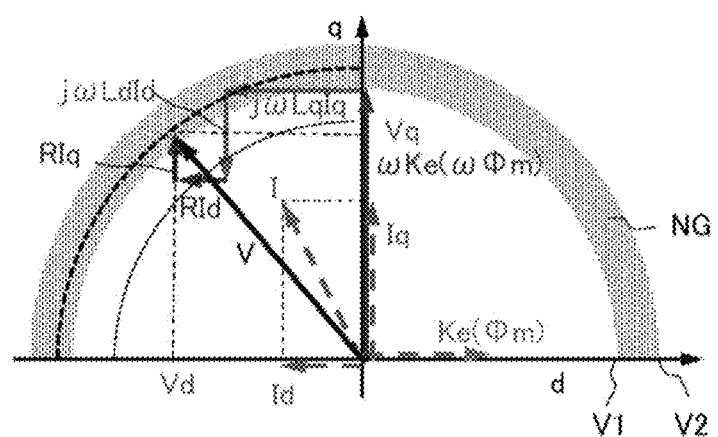
FIG. 9 is a vector diagram illustrating a relationship between a current command value and a voltage in a conventional technique.

FIG. 9 is a vector diagram illustrating a relationship between a current command value and a voltage in a conventional technique. V1 is a lower limit voltage of a voltage command non-settable region NG, and V2 is an upper limit voltage of the voltage command non-settable region NG. In the vector diagram of FIG. 9, Equation (1) and Equation (2) are displayed on the d axis (horizontal axis) and the q axis (vertical axis). Conventionally, a current command value has been designed so as not to exceed a current upper limit value and a voltage upper limit value with respect to a desired torque. In the present embodiment, the first current command generation unit 111 that generates a current command in a normal operation region generates and outputs the d-axis current command Id* and the q-axis current command Iq* so as to have a minimum current absolute value III with respect to the torque.

On the other hand, the second current command generation unit 112 of the present embodiment prevents a voltage absolute value |V|(=√(Vd 2+Vq^2)) with respect to the torque from falling within a predetermined voltage range. When the voltage absolute value is calculated, the voltage absolute value only needs to be calculated from a d-axis current and a q-axis current obtained by dq conversion of a detected three-phase current using Equation (1) and Equation (2). Specifically, when determining a combination of the d-axis current command Id* and the q-axis current command Iq* corresponding to the torque command T* according to Equation (7), the second current command generation unit 112 causes the voltage absolute value |V| according to these current commands to fall within the limits of Equations (9) to (10). That is, in a case where the dq-axis current commands Id* and Iq* generated by the first current command generation unit 111 do not satisfy the conditions of Equations (9) and (10), the second current command generation unit 112 obtains the dq-axis current commands Id* and Iq* satisfying these conditions to derive a current operation point used in the present embodiment.

$$V1 > |V| \quad (9)$$

or $$V2 < |V| \quad (10)$$

Here, V1 is a lower limit voltage of the voltage command non-settable region NG, and V2 is an upper limit voltage of the voltage command non-settable region NG.

Note that, when Equations (9) to (10) are expressed by using the voltage utilization rate and the battery voltage E, Equations (11) to (12) are obtained.

$$V1 > \sqrt{(2/3)} \cdot \text{voltage utilization rate} \cdot \text{(battery voltage } E\text{)} \quad (11)$$

or $$V2 < \sqrt{(2/3)} \text{voltage utilization rate(battery voltage } E\text{)} \quad (12)$$

Figure 10:
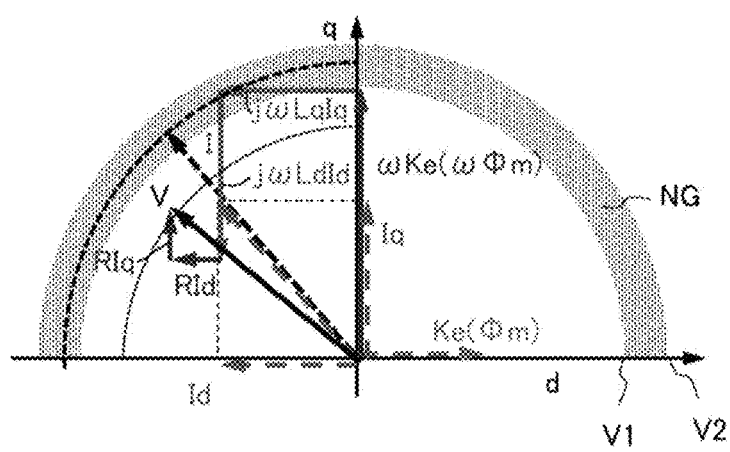
FIG. 10 is a vector diagram illustrating a relationship between a current command value and a voltage in the first embodiment.

FIG. 10 is a vector diagram illustrating a relationship between a current command value and a voltage in the present embodiment.

In the present embodiment, when the magnet temperature Tmag exceeds a predetermined value, the control unit 1 selects a current command generated by the second current command generation unit 112 in place of a current command for normal operation generated by the first current command generation unit 111 in the current command generation unit 11. In this manner, as shown in FIG. 10, due to energization with the d-axis current (weak field current) Id derived by Equations (9) to (11), a d-axis interference voltage ω*Ld Id increases, and a q-axis voltage Vq decreases accordingly, so that the voltage absolute value |V| becomes out of the voltage command non-settable region NG. That is, in a case where the magnet temperature Tmag of the rotor exceeds a predetermined temperature, the control unit 1 changes the AC voltage output from the inverter 3 without changing the output torque of the motor 2 by controlling the d-axis current based on the voltage utilization rate, so that the voltage absolute value |V| becomes out of the voltage command non-settable region NG.

In the present embodiment, the voltage utilization rate, which is a ratio between an AC voltage and a DC voltage, is changed by energization with the d-axis current (weak field current). However, there are several examples of changing the voltage utilization rate, and any example may be used. The examples will be described below.

First, an example in which the DC voltage is changed will be described with reference to FIG. 11. This example is suitable for a system in which the battery voltage E is boosted to have a DC power supply, and changes the voltage utilization rate that is a ratio to a desired AC voltage.

Figure 11:
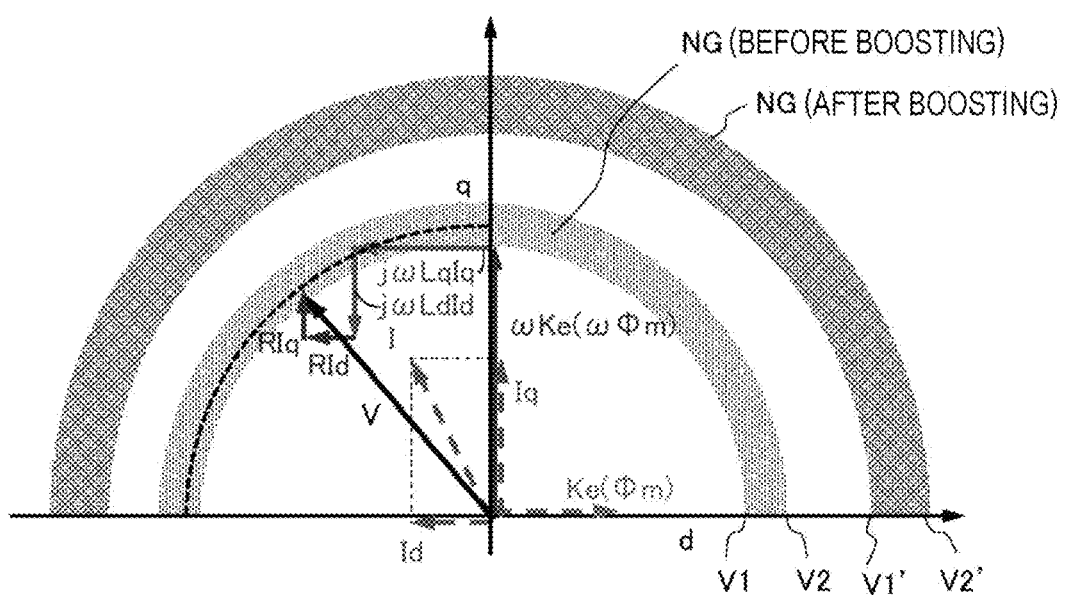
FIG. 11 is a vector diagram illustrating a relationship between a current command value and a voltage in a case where a DC voltage is changed.

As illustrated in FIG. 11, a voltage command is included in the voltage command non-settable region NG (V1 to V2) before boosting. However, by boosting, the voltage command non-settable region NG (V1' to V2') changes, so that the voltage command becomes out of the voltage command non-settable region NG (V1 to V2), that is, the voltage utilization rate changes, and the eddy current loss can be reduced. Note that the voltage utilization rate may be changed by lowering the battery voltage E instead of boosting the battery voltage E.

Figure 12:
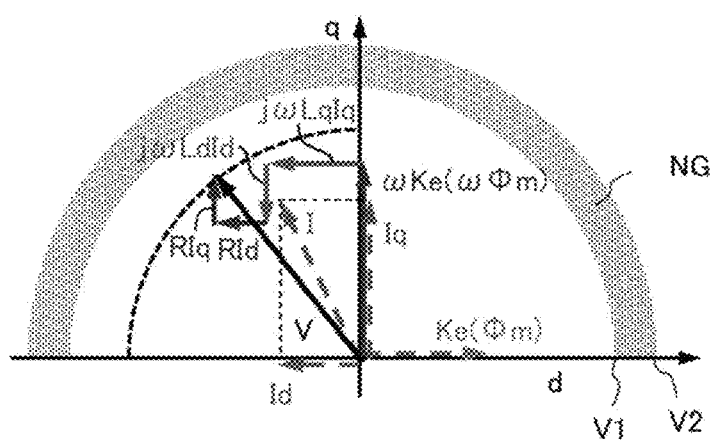
FIG. 12 is a vector diagram illustrating a relationship between a current command value and a voltage in a case where a motor rotational speed is changed.

Next, an example in which the motor rotational speed is changed will be described with reference to FIG. 12. This example is suitable for an engine generator system that obtains desired power by an engine, and makes it possible to freely control the voltage utilization rate, which is a ratio to a desired line voltage effective value, by freely controlling a rotational speed of a generator motor. FIG. 12 illustrates a voltage command after the motor rotational speed is changed. By changing the rotational speed of the motor, non-interference terms (jωLdId and jωLqIq) and an induced voltage term (ω*Ke) are changed and the line voltage effective value is reduced. In this manner, the voltage utilization rate changes, and the eddy current loss can be reduced.

Note that the various methods for changing the voltage utilization rate described above may be used alone or a plurality of the method may be used in combination. In the present embodiment, a desired voltage utilization rate can be achieved by employing an optional method.

According to the present embodiment, even in a case where the magnet temperature exceeds a predetermined value, the voltage absolute value |V| does not fall within a predetermined range, and a harmonic voltage twice the switching frequency is reduced. As a result, the eddy current loss of the rotor magnet can be reduced, and the continuous rating of the motor used in an environmentally friendly vehicle such as an electric car or a hybrid car can be improved. That is, it is possible to improve the torque of the motor necessary for continuous traveling such as traveling on a slope at a high speed.

Furthermore, according to the present embodiment, the output of the motor can be improved even in a case where a permanent magnet synchronous motor having the same size as a conventional permanent magnet synchronous motor is used, and the output of the motor control device can be increased. Furthermore, by using the motor control device, there is an effect equivalent to that obtained by increasing demagnetization resistance of a magnet, a use amount of the magnet can be reduced, and the cost of the motor control device can also be reduced.

Second Embodiment

Figure 13:
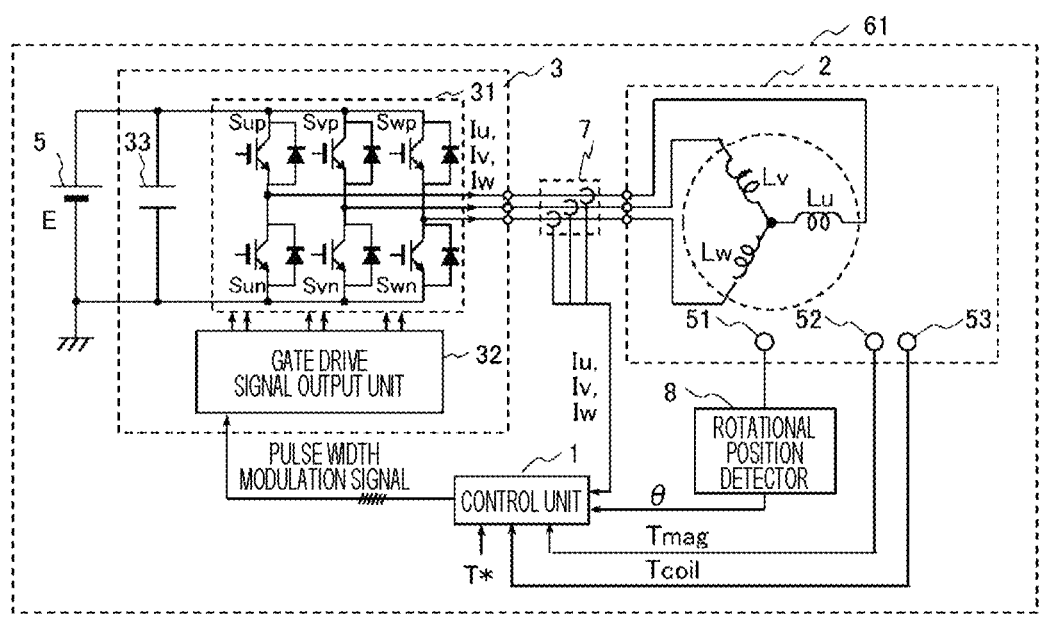
FIG. 13 is a configuration diagram of the motor control device according to a second embodiment.

FIG. 13 is a configuration diagram of a motor drive device 61 including the motor control device according to the present embodiment. The same portions as those of the motor drive device 61 according to the first embodiment illustrated in FIG. 1 are denoted by the same reference numerals, and omitted from the description. The present embodiment is different from the first embodiment illustrated in FIG. 1 in that a coil temperature sensor 53 of a stator is mounted on the motor 2. Note that a coil temperature of the stator of the motor 2 may be estimated based on the temperature dependency of an induced voltage by Equation (3) or the like.

As illustrated in FIG. 13, the control unit 1 receives a coil temperature Tcoil from the coil temperature sensor 53. In the present embodiment, the control unit 1 constantly monitors whether the coil temperature of the stator exceeds a predetermined temperature.

Figure 14:
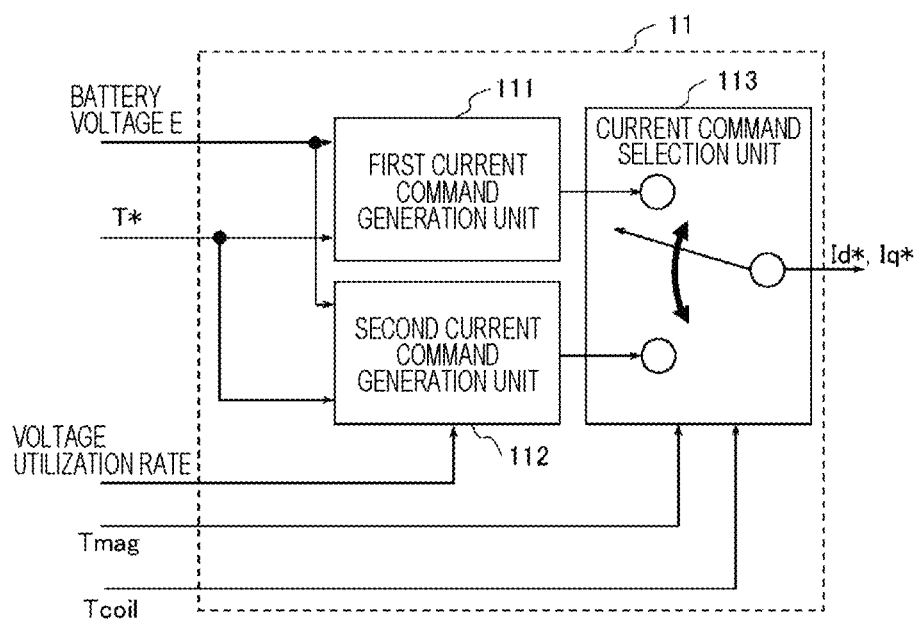
FIG. 14 is a block diagram of a current command generation unit in the second embodiment.

FIG. 14 is a block diagram of the current command generation unit 11 according to the present embodiment. The same portions in the block diagram of the current command generation unit 11 illustrated in FIG. 8 are denoted by the same reference numerals, and omitted from the description. In the present embodiment, the coil temperature Tcoil is input to the current command selection unit 113.

Figure 15:
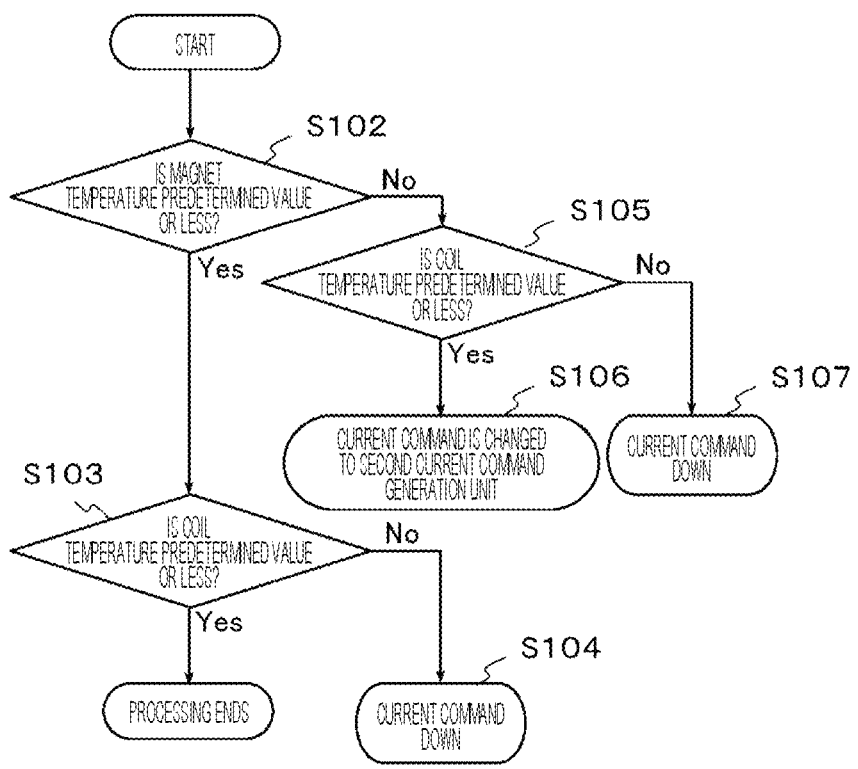
FIG. 15 is a flowchart illustrating operation of a control unit in the second embodiment.

FIG. 15 is a flowchart illustrating operation of the control unit 1 in the present embodiment. The control unit 1 repeats the operation illustrated in the flowchart of FIG. 15 at regular time intervals.

In Step S102 of FIG. 15, the control unit 1 determines whether the magnet temperature Tmag is equal to or less than a predetermined value. If the magnet temperature Tmag is equal to or less than the predetermined value, the control unit 1 determines in next Step S103 whether the coil temperature Tcoil is equal to or less than a predetermined value. If the coil temperature Tcoil is equal to or less than the predetermined value, the processing ends without doing anything. In a case where it is determined in Step S103 that the coil temperature Tcoil is higher than the predetermined value, a current amplitude is lowered in next Step S104 in order to reduce the coil loss proportional to the square of the resistance and the current. Specifically, values of the d-axis current command Id* and the q-axis current command Iq* are changed such that the current amplitude becomes smaller than values of the d-axis current command Id* and the q-axis current command Iq* output in a case where the coil temperature Tcoil is equal to or less than a predetermined value. In this manner, driving of the motor 2 is controlled so as to reduce the output torque of the motor 2 more than an input torque command.

In a case where it is determined in Step S102 that the magnet temperature Tmag exceeds the predetermined value, the processing proceeds to Step S105 to determine whether the coil temperature Tcoil is equal to or less than the predetermined value. When the coil temperature Tcoil is equal to or less than the predetermined value, in next Step S106, a generation source of a current command selected by the current command selection unit 113 and output from the control unit 1 is switched from the first current command generation unit 111 that generates a current command for normal operation to the second current command generation unit 112 that reduces the magnet eddy current loss. In this manner, the current amplitude increases while the output torque is kept constant.

In a case where it is determined in Step S105 that the coil temperature (coil is higher than the predetermined value, in order to reduce the coil loss proportional to the square of the resistance and the current, in next Step S107, the current amplitude is lowered similarly to Step S104, so that the output torque of the motor 2 is reduced more than that in an input torque command.

Figure 16:
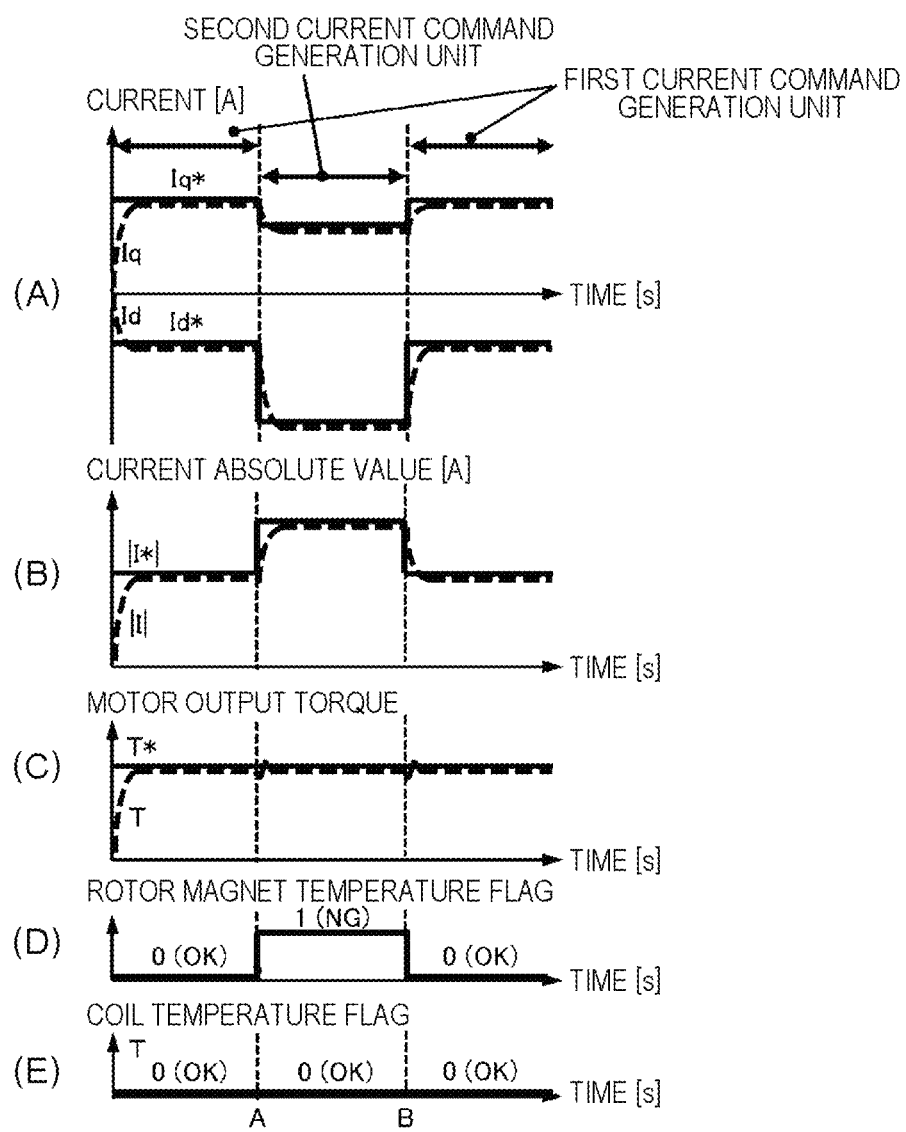
FIG. 16 is a time chart of the control unit in the second embodiment.

FIG. 16 is a time chart of the control unit 1 according to the present embodiment. FIG. 16(A) illustrates the d-axis current Id, the q-axis current Iq, the d-axis current command Id*, and the q-axis current command Iq*, FIG. 16(B) illustrates the current absolute value |I| and a current command absolute value |I*|, FIG. 16(C) illustrates the output torque T and the torque command T* of the motor 2, FIG. 16(D) illustrates a rotor magnet temperature flag, and FIG. 16(E) illustrates a coil temperature flag. The horizontal axis represents time change.

As illustrated in FIGS. 16(D) and 16(E), the magnet temperature flag of the rotor and the coil temperature flag are both zero from time 0 at the beginning to time A, and the output of the first current command generation unit 111 is used in this period as illustrated in FIGS. 16(A) to 16(C).

When the magnet temperature exceeds a predetermined temperature from time A to time B, the rotor magnet temperature flag becomes one, and the output of the second current command generation unit 112 is used during this period. At this time, as illustrated in FIG. 16(B), the current absolute value II increases, and as illustrated in FIG. 16(C), the torque command and the torque output in the steady state are not changed. As a result, even if the rotor magnet temperature exceeds the predetermined temperature, the output motor torque does not change, so that the influence on the vehicle vibration and noise can be minimized. Further, when the rotor temperature falls below the predetermined temperature after time B, the rotor magnet temperature flag becomes zero, and the output of the first current command generation unit 111 is used after time B. Also at this time, the torque command and the torque output in the steady state are not changed.

According to the present embodiment, by detecting the coil temperature of the stator in addition to the rotor magnet temperature, both demagnetization of the magnet and temperature rise of the coil can be prevented, and the continuous rating of the motor 2 can be improved similarly to the first embodiment. In this manner, it is possible to improve torque required for continuous traveling such as traveling on a slope at a high speed in an environmentally friendly vehicle such as an electric car or a hybrid car. Further, even if the rotor magnet temperature exceeds the predetermined temperature, a current command that does not cause the output motor torque to change can be generated, so that the influence on the vehicle vibration and noise can be minimized.

Third Embodiment

Figure 17:
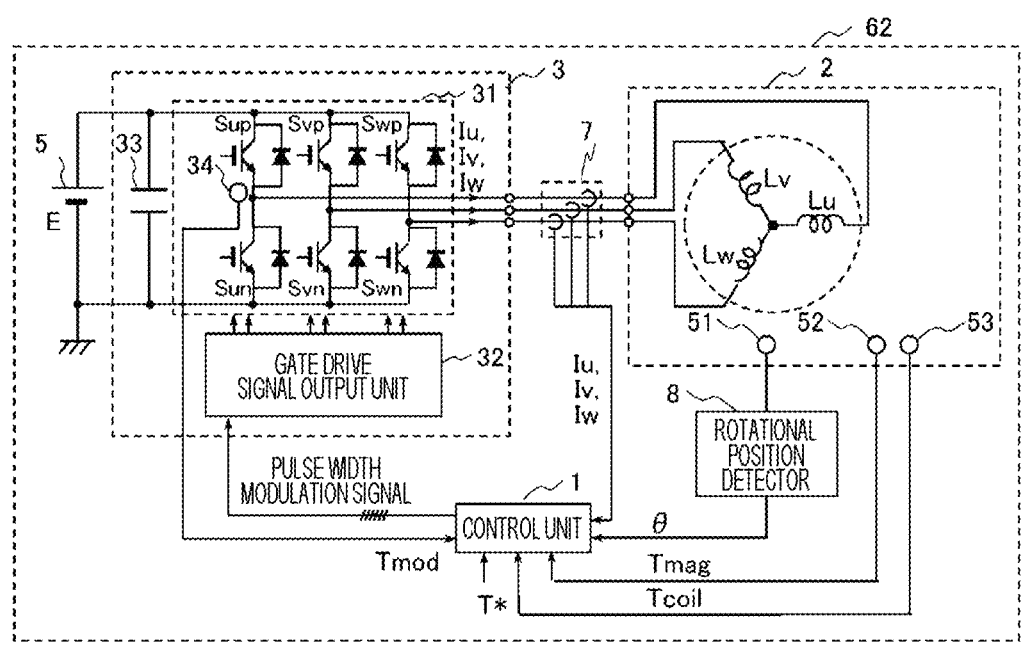
FIG. 17 is a configuration diagram of the motor control device according to a third embodiment.

FIG. 17 is a configuration diagram of a motor drive device 62 including the motor control device according to the present embodiment. The same portions as those of the motor drive device 61 according to the second embodiment illustrated in FIG. 13 are denoted by the same reference numerals, and omitted from the description. The present embodiment is different from the second embodiment illustrated in FIG. 13 in that a temperature sensor 34 that detects a module temperature of the inverter 3 is mounted.

The temperature sensor 34 is provided in the inverter 3, and detects, for example, the temperature of each switching element of the inverter circuit 31 as a module temperature of the inverter 3. Note that the module temperature of the inverter 3 may be estimated based on a drive signal of a switching element or the like.

As illustrated in FIG. 17, a module temperature Tmod is input from the temperature sensor 34 to the control unit 1. In the present embodiment, the control unit 1 constantly monitors whether the module temperature Tmod of the inverter 3 exceeds a predetermined temperature.

Figure 18:
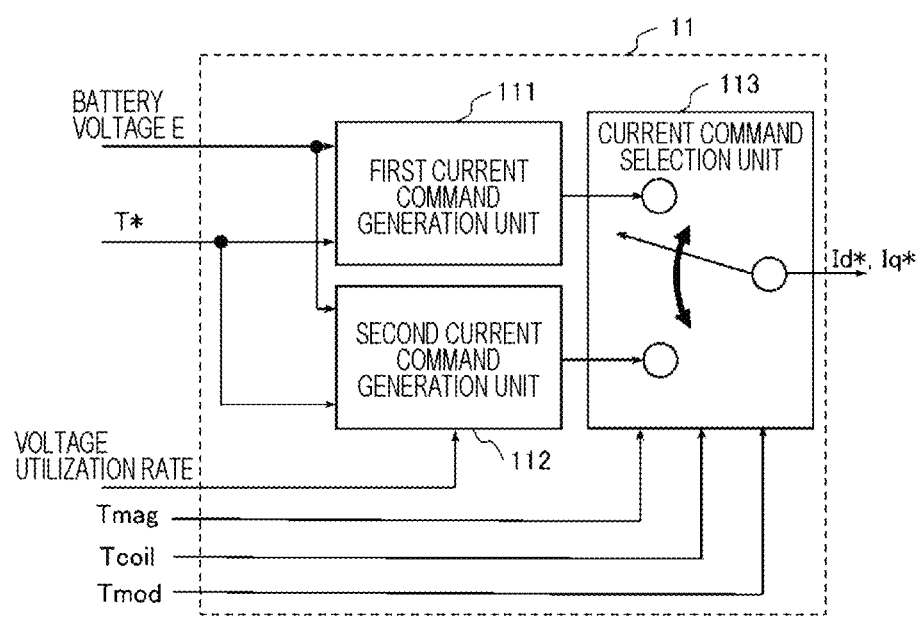
FIG. 18 is a block diagram of the current command generation unit in the third embodiment.

FIG. 18 is a block diagram of the current command generation unit 11 according to the present embodiment. The same portions in the block diagram of the current command generation unit 11 illustrated in FIG. 14 are denoted by the same reference numerals, and omitted from the description.

In the present embodiment, the module temperature Tmod is input to the current command selection unit 113.

Figure 19:
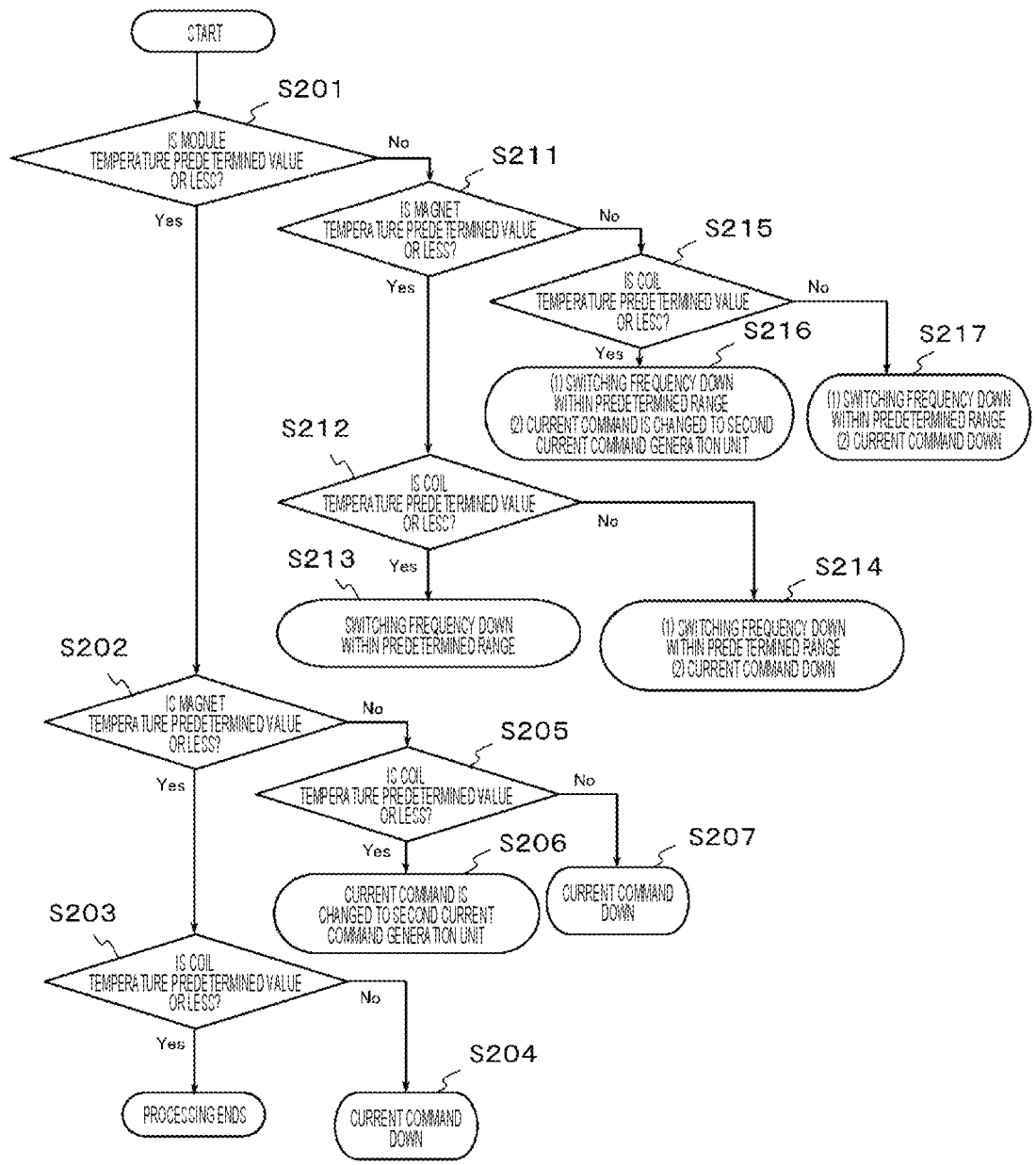
FIG. 19 is a flowchart illustrating operation of the control unit in the third embodiment.

FIG. 19 is a flowchart illustrating operation of the control unit 1 in the present embodiment. The control unit 1 repeats the operation illustrated in the flowchart of FIG. 19 at regular time intervals.

In Step S201 of FIG. 19, the control unit 1 determines whether the module temperature Tmod of the inverter 3 is equal to or less than a predetermined value. In a case where it is determined that the module temperature Tmod is equal to or less than the predetermined value, the processing proceeds to Step S202.

In Step S202 of FIG. 19, the control unit 1 determines whether the magnet temperature Tmag is equal to or less than a predetermined value. If the magnet temperature Tmag is equal to or less than the predetermined value, the control unit 1 determines in next Step S203 whether the coil temperature Tcoil is equal to or less than a predetermined value. If the coil temperature Tcoil is equal to or less than the predetermined value, the processing ends without doing anything. In a case where it is determined in Step S203 that the coil temperature Tcoil is higher than the predetermined value, a current amplitude is lowered in next Step S204 in order to reduce the coil loss proportional to the square of the resistance and the current. Here, as similar to Step S104 of FIG. 15 described in the second embodiment, values of the d-axis current command Id* and the q-axis current command Iq* are changed such that the current amplitude becomes smaller than values of the d-axis current command Id* and the q-axis current command Iq* output in a case where the coil temperature Tcoil is equal to or less than a predetermined value. In this manner, driving of the motor 2 is controlled so as to reduce the output torque of the motor 2 more than an input torque command.

In a case where it is determined in Step S202 that the magnet temperature Tmag exceeds the predetermined value, the processing proceeds to Step S205 to determine whether the coil temperature Tcoil is equal to or less than the predetermined value. When the coil temperature Tcoil is equal to or less than the predetermined value, in next Step S206, a generation source of a current command selected by the current command selection unit 113 and output from the control unit 1 is switched from the first current command generation unit 111 that generates a current command for normal operation to the second current command generation unit 112 that reduces the magnet eddy current loss. In this manner, the current amplitude increases while the output torque is kept constant.

In a case where it is determined in Step S205 that the coil temperature Tcoil is higher than the predetermined value, in order to reduce the coil loss proportional to the square of the resistance and the current, in next Step S207, the current amplitude is lowered similarly to Step S204, so that the output torque of the motor 2 is reduced more than that in an input torque command.

In a case where it is determined in Step S201 of FIG. 19 that the module temperature Tmod is higher than the predetermined value, the processing proceeds to Step S211. In Step S211, it is determined whether the magnet temperature Tmag is equal to or less than a predetermined value. If the magnet temperature Tmag is equal to or less than the predetermined value, the processing proceeds to Step S212 and whether the coil temperature Tcoil is equal to or less than a predetermined value is determined. When the coil temperature Tcoil is equal to or less than the predetermined value, the switching frequency fc is lowered within a range expressed by Equation (13) in Step S213. When the switching frequency fc does not satisfy Equation (13), the rotational speed of the motor is lowered so that Equation (13) is satisfied. That is, the switching frequency fc is nine times or more a motor fundamental frequency determined by the rotational speed and the number of poles of the motor 2.

$$fc \geq 9*(\text{motor rotational speed})/60*(\text{number of pole pairs}) \quad (13)$$

In a case where it is determined in Step S212 that the coil temperature Tcoil is higher than the predetermined value, that is, in a case where the magnet temperature Tmag is equal to or less than the predetermined value and the coil temperature Tcoil is higher than the predetermined value, in Step S214, the switching frequency fc is lowered within the range of the expression of Equation (13), and the current amplitude is lowered to reduce the output torque of the motor 2. By reducing the current amplitude and the switching frequency fc in this manner, driving can be performed while both the stator coil of the motor 2 and the switching element of the inverter 3 are protected.

Next, in a case where it is determined in Step S211 that the magnet temperature Tmag is higher than the predetermined value, the processing proceeds to Step S215 to determine whether the coil temperature Tcoil is equal to or less than the predetermined value. When the coil temperature Tcoil is equal to or less than the predetermined value, in Step S216, the switching frequency fc is lowered within the range of Equation (13), and a generation source of a current command selected by the current command selection unit 113 and output from the control unit 1 is changed from the first current command generation unit 111 that generates the current command for the normal operation to the second current command generation unit 112. When the switching frequency fc is lowered, an amplitude of a harmonic current that is one time or two times the switching frequency increases in inverse proportion. For this reason, the switching frequency fc is lowered within the range of Equation (13), the torque command is lowered, and the current amplitude is reduced. In a case where Equation (13) is not satisfied, the rotational speed of the motor 2 is lowered so that Equation (13) is satisfied.

In a case where it is determined in Step S215 that the coil temperature Tcoil is higher than the predetermined value, the processing proceeds to Step S217. That is, in a case where the magnet temperature Tmag is higher than the predetermined value and the coil temperature Tcoil is higher than the predetermined value, in Step S217, the switching frequency fc is lowered within the range of Equation (13), and the torque command is lowered to reduce the current amplitude. Equation (13) is not satisfied, the rotational speed of the motor is lowered so that Equation (13) is satisfied. In a case where the switching frequency fc cannot be changed within the range of Equation (13) in a case where the magnet temperature Tmag is higher than the predetermined value and the coil temperature Tcoil is higher than the predetermined value, the torque command of the motor 2 is controlled to be zero to allow any of constraints to be eliminated so that the driving is continued.

According to the present embodiment, by detecting the module temperature Tmod of the switching element in addition to the magnet temperature Tmag and the coil temperature Tcoil, both demagnetization of the magnet and abnormality of the coil can be prevented, and the continuous rating of the motor 2 can be improved similarly to the first embodiment. In this manner, it is possible to improve torque required for continuous traveling such as traveling on a slope at a high speed in an environmentally friendly vehicle such as an electric car or a hybrid car. Furthermore, even if the rotor magnet temperature exceeds the predetermined temperature, a current command that does not cause the output torque of the motor 2 to change can be generated and output, so that the influence on the vehicle vibration and noise can be minimized.

Fourth Embodiment

Figure 20:
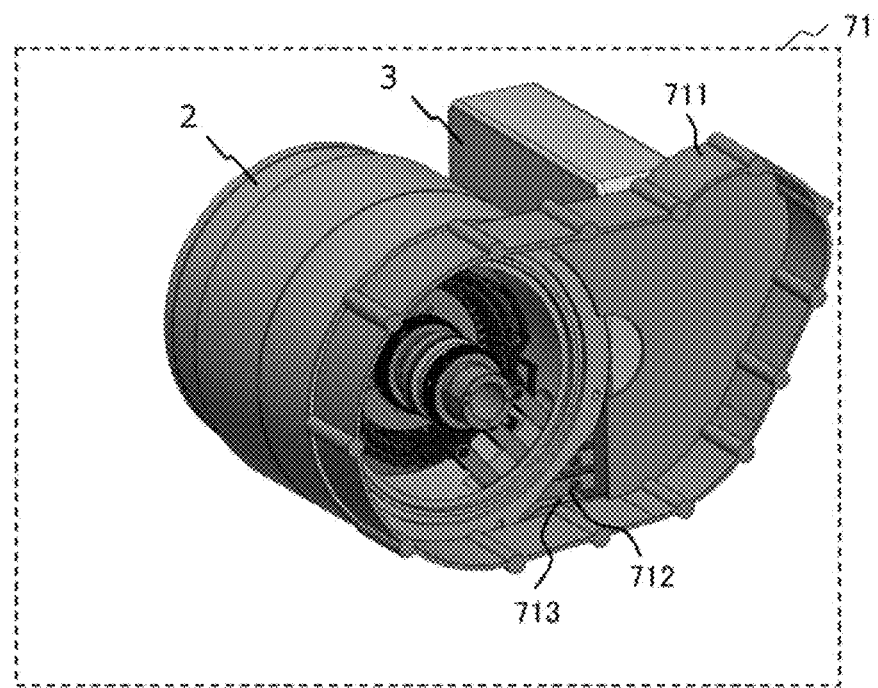
FIG. 20 is an external perspective view of an electromechanical integrated unit according to a fourth embodiment.

FIG. 20 is an external perspective view of an electromechanical integrated unit 71 according to a fourth embodiment.

As illustrated in FIG. 20, the electromechanical integrated unit 71 includes the motor drive device 6, 61, or (the control unit 1, the motor 2, and the inverter 3) described in the first to third embodiments. The motor 2 and the inverter 3 are connected by a coupling portion 713 via a bus bar 712.

The output of the motor 2 is transmitted to a differential gear (not illustrated) via the gear 711 and is transmitted to an axle. Note that, although illustration of the control unit 1 is omitted in FIG. 20, the control unit 1 can be arranged at an optional position.

A feature of the electromechanical integrated unit 71 is a structure in which the motor 2, the inverter 3, and the gear 711 are integrated. In the electromechanical integrated unit 71, due to its structure, the magnet temperature of the rotor of the motor 2, the coil temperature of the stator of the motor 2, and the module temperature of the inverter 3 are deteriorated by heat generated in the motor 2, the inverter 3, and the gear 711. However, by controlling the drive of the motor 2 using the control unit 1 described in the first to third embodiments, it is possible to prevent an increase in the magnet temperature of the rotor, improve the continuous rating torque, and realize a small electromechanical integrated unit.

Fifth Embodiment

Figure 21:
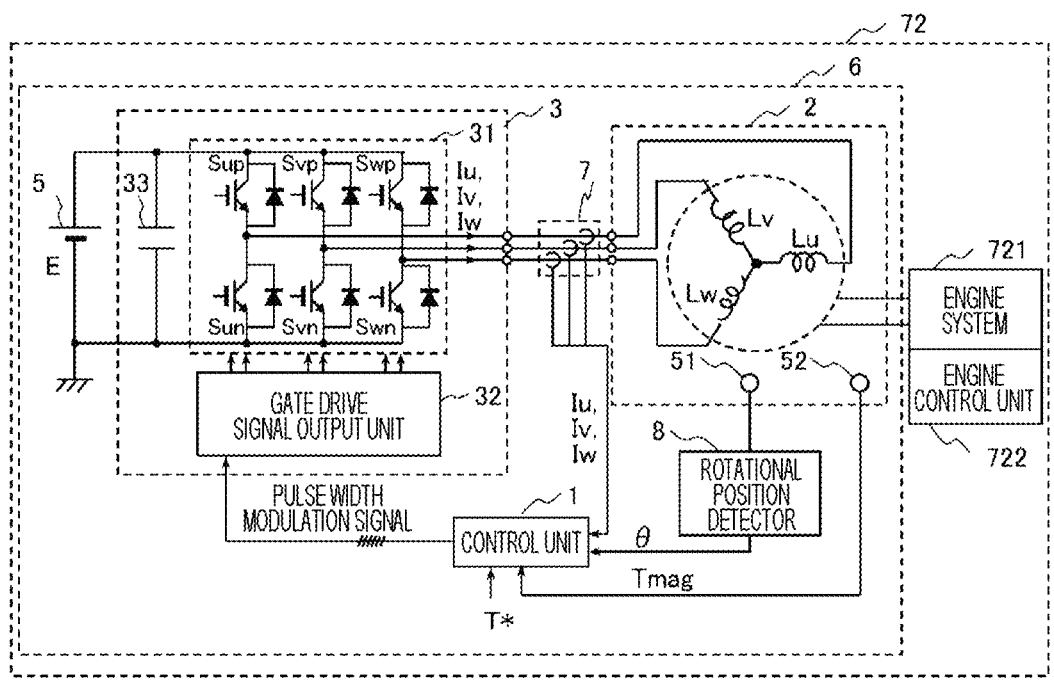
FIG. 21 is a configuration diagram of a generator system according to a fifth embodiment.

FIG. 21 is a configuration diagram of a generator system 72 according to a fifth embodiment. The generator system 72 includes the motor drive device 6, an engine system 721 connected to the motor 2, and an engine control unit 722. The configuration of the motor drive device 6 is similar to that in FIG. 1 described in the first embodiment, and the same reference numerals are attached to the same portions, and the description of the same portions will be omitted.

The engine system 721 is given a command by the engine control unit 722, and is normally rotated at a most efficient rotational speed of the engine system 721. However, in a case where a voltage command at the rotational speed is in the voltage command non-settable region NG, there is a possibility that the magnet eddy current loss occurs and the magnet is demagnetized in the worst case.

In view of the above, by using the motor drive device described in the first to third embodiments, an increase in the magnet temperature of the rotor is prevented, and the engine speed is changed even in a case where the magnet temperature is high.

An example of changing the motor rotational speed to be the engine rotation will be described with reference to FIGS. 9 and 12. FIG. 9 illustrates a voltage command before the motor rotational speed is changed, and FIG. 12 illustrates a voltage command after the motor rotational speed is changed. The electrical angular frequency of the motor in FIG. 9 is ω, whereas the electrical angular frequency of the motor in FIG. 12 is ω1. These electrical angular frequencies have a relationship of ω>ω1. By changing the electrical angular frequency, the motor rotational speed, which is equivalent to an engine rotational speed, can be changed. In this manner, non-interference terms (j*ω1*Ld*Id and j*ω1*Lq*Iq) and an induced voltage term (ω1*Ke) become small, so that the voltage absolute value |V| is lowered. In this manner, the line voltage effective value is lowered, the voltage utilization rate is lowered, and Equations (9) to (10) are not satisfied, so that the eddy current loss can be reduced.

According to the present embodiment, even in a case where the magnet temperature exceeds a predetermined value, the voltage absolute value does not fall within a predetermined range, and a harmonic voltage twice the switching frequency is not generated. As a result, the eddy current loss of the rotor magnet can be reduced, and the continuous rating of the motor used in an environmentally friendly vehicle such as an electric car or a hybrid car can be improved. That is, it is possible to improve torque required for continuous traveling such as traveling on a slope at a high speed, and it is possible to stably generate driving power of an environmentally friendly vehicle such as a hybrid car. In the present embodiment, the motor drive device 6 is described as a representative. However, an effect can be obtained by using the motor drive device 61 (second embodiment) or the motor drive device 62 (third embodiment).

Sixth Embodiment

Figure 22:
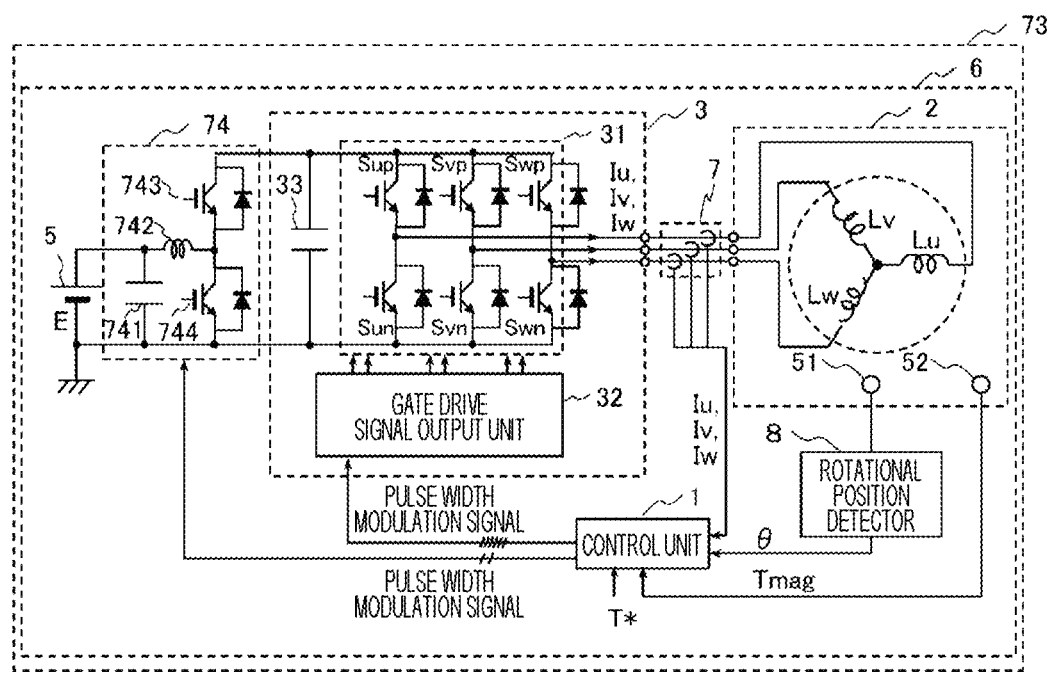
FIG. 22 is a configuration diagram of a boost converter system according to a sixth embodiment.

FIG. 22 is a configuration diagram of a boost converter system 73 according to a sixth embodiment. The boost converter system 73 includes the motor drive device 6, and boosts a DC voltage of the high-voltage battery 5 or the like to a desired voltage by the boost converter 74. The configuration of the motor drive device 6 is similar to that in FIG. 1 described in the first embodiment, and the same reference numerals are attached to the same portions, and the description of the same portions will be omitted.

In the boost converter 74, switching elements 743 and 744 are connected in series, and the high-voltage battery 5 is connected to an intermediate connection point between the switching elements 743 and 744 connected in series via a reactor 742. Further, a capacitor 741 is connected in parallel with the high-voltage battery 5.

The switching elements 743 and 744 are diode-connected.

The boost converter 74 is given a command by the control unit 1 and boosted to a most efficient DC voltage of the boost converter system 73. However, in a case where a voltage command at the DC voltage is in the voltage command non-settable region NG, there is a possibility that the magnet eddy current loss occurs and the magnet is demagnetized in the worst case.

In that case, a focus is placed on the fact that the DC voltage input to the inverter 3 can be freely changed by the boost converter 74 and the DC voltage is changed, so that the voltage utilization rate, which is a ratio between the DC voltage and the line voltage effective value, is freely controlled and the magnet eddy current loss is reduced. This example will be described with reference to FIGS. 9 and 11.

FIG. 9 illustrates a voltage command when the DC voltage is not changed by the boost converter 74, and FIG. 11 illustrates a voltage command when the DC voltage is changed by the boost converter. By changing the DC voltage, the voltage utilization rate, which is the ratio between the DC voltage and the line voltage effective value, is changed. In FIG. 9 before the boosting, a voltage command is within the voltage command non-settable region NG (V1 to V2). However, in FIG. 11 after the boosting, the voltage command non-settable region NG (V1' to V2') changes and the voltage command is not within the range, so that the eddy current loss can be reduced.

According to the present embodiment, it is possible to prevent an increase in the magnet temperature of the rotor, to maintain a desired output by changing the boosted voltage of the boost converter 74 even in a case where the magnet temperature is high, and to continue driving of an environmentally friendly vehicle such as a hybrid car or an electric car. In the present embodiment, the motor drive device 6 is described as a representative. However, an effect can be obtained by using the motor drive device 61 (second embodiment) or the motor drive device 62 (third embodiment).

Seventh Embodiment

Figure 23:
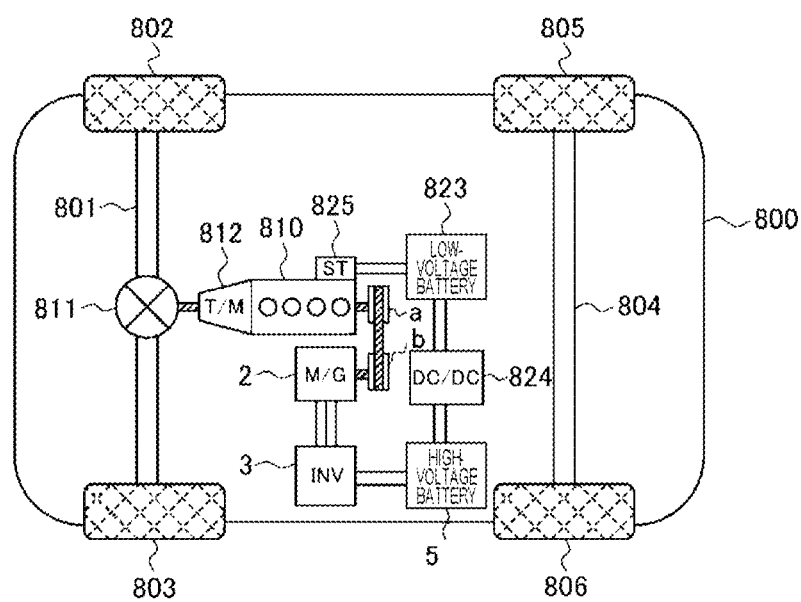
FIG. 23 is a configuration diagram of a hybrid car system in a seventh embodiment.

FIG. 23 is a configuration diagram of an electric vehicle system according to the present embodiment. As illustrated in FIG. 23, a hybrid vehicle system has a power train in which the motor 2 is applied as a motor/generator, and the vehicle travels using a rotational driving force of the motor 2. Note that the system is not limited to a hybrid vehicle system but may also be an electric vehicle system. The motor 2, the inverter 3, the high-voltage battery 5, and the like are similar to those of the motor drive device in the first to third embodiments.

In FIG. 23, a front wheel axle 801 is rotatably supported in a front portion of a vehicle 800 of a hybrid car, and front wheels 802 and 803 are provided at both ends of the front wheel axle 801. A rear wheel axle 804 is rotatably supported in a rear portion of the vehicle 800, and rear wheels 805 and 806 are provided at both ends of the rear wheel axle 804.

A differential gear 811 which is a power distribution mechanism is provided in a central portion of the front wheel axle 801, and a rotational driving force transmitted from an engine 810 via a transmission 812 is distributed to the left and right front wheel axles 801.

In the engine 810 and the motor 2, a pulley a provided on a crankshaft of the engine 810 and a pulley b provided on a rotation shaft of the motor 2 are mechanically connected via a belt. In this manner, a rotational driving force of the motor 2 can be transmitted to the engine 810, and a rotational driving force of the engine 810 can be transmitted to the motor 2. In the motor 2, three-phase AC power controlled by the inverter 3 is supplied to the coil of the stator, so that the rotor rotates and generates a rotational driving force according to the three-phase AC power.

That is, while the motor 2 is controlled by the inverter 3 to operate as an electric motor, the motor 2 operates as a generator that generates three-phase AC power as the rotor rotates by receiving the rotational driving force of the engine 810 and an electromotive force is induced in the coil of the stator.

The inverter 3 is a power conversion device that converts DC power supplied from the high-voltage battery 5, which is a high-voltage (42 V or 300 V) system power supply, into three-phase AC power, and controls a three-phase AC current flowing through the stator coil of the motor 2 according to a magnetic pole position of the rotor according to an operation command value.

The three-phase AC power generated by the motor 2 is converted into DC power by the inverter 3 so that the high-voltage battery 5 is charged. The high-voltage battery 5 is electrically connected to a low-voltage battery 823 via a DC-DC converter 824. The low-voltage battery 823 constitutes a low-voltage (14 V) system power supply of the vehicle 800, and is used as a power supply for a starter 825 that initially starts (starts in a cold state) the engine 810, a radio, lights, and the like.

When the vehicle 800 is stopped (idle stop mode) to wait for a traffic light and the like, the engine 810 is stopped, and when the engine 810 is restarted (started in a hot state) at the time the vehicle restarts, the motor 2 is driven by the inverter 3 to start the engine 810. Note that, in the idle stop mode, in a case where a charging amount of the high-voltage battery 5 is insufficient or in a case where the engine 810 is not sufficiently warmed, the engine 810 is not stopped and continues to be driven. Further, during the idle stop mode, it is necessary to secure a drive source of auxiliary machines using the engine 810 as a drive source, such as a compressor of an air conditioner. In this case, the motor 2 is driven to drive the auxiliary machines.

Even at the time of an acceleration mode or a high load operation mode, the motor 2 is driven to assist the driving of the engine 810, and the vehicle 800 is caused to travel. In contrast, at the time of a charging mode in which the high-voltage battery 5 needs to be charged, the engine 810 causes the motor 2 to generate power to charge the high-voltage battery 5. That is, regeneration is performed at the time of braking, deceleration, or the like of the vehicle 800.

According to the present embodiment, in the electric vehicle system including the motor drive device of the first to third embodiments, even in a case where the magnet temperature exceeds a predetermined value, a voltage absolute value does not fall within a predetermined range by changing the line voltage effective value, the DC voltage (in the case of the boosting system), and the motor rotational speed (in the case of the engine generator), and a harmonic voltage twice the switching frequency is not generated. As a result, the eddy current loss of the rotor magnet can be reduced, and the continuous rating of the motor used in an environmentally friendly vehicle such as an electric car or a hybrid car can be improved. That is, it is possible to improve torque required for continuous traveling such as traveling on a slope at a high speed.

Note that each configuration (FIGS. 2 and 3) in the control unit 1 may realize a function of each configuration by a CPU and a program without depending on the configuration by hardware. In a case where each configuration in the control unit 1 is realized by a CPU and a program, there is an advantage that the cost can be reduced because the number of pieces of hardware is reduced. Further, FIGS. 15 and 19 are flowcharts showing operation of the control unit 1. However, the program shown in this flowchart can be executed by a computer including a CPU, a memory, and the like. All or part of the processing may be realized by a hard logic circuit. Furthermore, this program can be provided by being stored in a storage medium of a motor control device in advance. Alternatively, the program may be stored and provided in an independent storage medium, or the program may be recorded and stored in a storage medium of a motor control device via a network line. The program may also be supplied as a computer-readable computer program product in various forms, such as a data signal (carrier wave).

According to the embodiments described above, a function and an effect described below can be obtained.

(1) In the motor control devices 6, 61, and 62, the control unit 1 is connected to the inverter 3 that converts a DC voltage into a three-phase AC voltage to drive the motor 2, and controls driving of the motor 2 by outputting a pulse width modulation signal to the inverter 3. In a case where the magnet temperature of the rotor of the motor 2 exceeds a predetermined temperature, the control unit 1 controls the d-axis current in the motor 2 based on a ratio of the AC voltage to the DC voltage. In this manner, it is possible to improve output of the motor 2 while reducing eddy current loss of a magnet installed in the motor 2 and avoiding irreversible demagnetization of the magnet.

(2) In the motor control device 62, the control unit 1 is connected to the inverter 3 that converts a DC voltage into a three-phase AC voltage to drive the motor 2, and controls driving of the motor 2 by outputting a pulse width modulation signal to the inverter 3. The control unit 1 acquires the magnet temperature of the rotor of the motor 2, the coil temperature of the stator of the motor 2, and the module temperature of the inverter 3, and changes at least one of the current flowing through the motor 2 and the switching frequency of the inverter 3 in a case where at least one of the acquired magnet temperature, coil temperature, and module temperature exceeds a predetermined temperature set to each of them in advance. In this manner, it is possible to improve output of the motor 2 while reducing eddy current loss of a magnet installed in the motor 2 and avoiding irreversible demagnetization of the magnet.

(3) The motor control devices 6, 61, and 62 are a motor control device that is connected to the inverter 3 that converts a DC voltage into a three-phase AC voltage to drive the motor 2 and controls driving of the motor 2 by outputting a pulse width modulation signal to the inverter 3, and change the AC voltage based on a ratio of the AC voltage to the DC voltage in a case where the magnet temperature of the rotor of the motor 2 exceeds a predetermined temperature. In this manner, it is possible to improve output of the motor 2 while reducing eddy current loss of a magnet installed in the motor 2 and avoiding irreversible demagnetization of the magnet.

The present invention is not limited to the above-described embodiment, and other forms conceivable within the scope of the technical idea of the present invention are also included in the scope of the present invention as long as the characteristics of the present invention are not impaired. Further, a configuration in which a plurality of the above-described embodiments are combined may be employed.

REFERENCE SIGNS LIST 1 control unit
2 motor
3 inverter
5 high-voltage battery
6, 61, 62 motor control device
7 current detection unit
8 rotational position detector
11 current command generation unit
12 three-phase/dq conversion unit
13 current control unit
14 voltage command generation unit
15 gate signal generation unit
16 speed calculation unit
17 triangular wave generation unit
31 inverter circuit
32 gate drive signal output unit
33 smoothing capacitor
34 temperature sensor
41 rotational position detector
51 rotational position sensor
52 magnet temperature sensor
53 coil temperature sensor
71 electromechanical integrated unit
72 generator system
73 boost converter system
74 boost converter
111 first current command generation unit
112 second current command generation unit
113 current command selection unit
711 gear
712 bus bar
713 coupling portion
721 engine system
722 engine control unit
741 capacitor
742 reactor
743, 744 switching element
800 vehicle
801 front wheel axle
802 front wheel
803 front wheel
804 rear wheel axle
805 rear wheel
806 rear wheel
810 engine
a, b pulley
811 differential gear
812 transmission
823 low-voltage battery
824 DC-DC converter
825 starter
f1 motor fundamental frequency
fc switching frequency
Sup, Svp, Swp, Sun, Svn, Swn switching element
Id d-axis current value
Id* d-axis current command
Iq q-axis current value
Iq* q-axis current command
Ld d-axis inductance
Lq q-axis inductance
Iu U-phase AC current
Iv V-phase AC current
Iw W-phase AC current
|I| current absolute value
|I*| absolute value of current command
Ke induced voltage constant
T* torque command
Vd* d-axis voltage command
Vq* q-axis voltage command
Vu* U-phase voltage command value
Vv* V-phase voltage command value
Vw* W-phase voltage command value
V1 lower limit voltage of voltage command non-settable region NG
V2 upper limit voltage of voltage command non-settable region NG
θ rotational position
ωr electrical angular frequency
Tmag magnet temperature
Tcoil coil temperature
Tmod module temperature of switching element.

The invention claimed is:

1. A motor control drive device comprising:
a three-phase synchronous motor;
a power converter connected to the three-phase motor, the power converter converts a DC voltage into a three-phase AC voltage to drive the three-phase synchronous motor; and
a controller that is connected to the power converter and comprises a current command generation unit comprising a first current command generation unit, and a second current command generation unit, the current command generation unit configured to:
   acquire a magnet temperature from one of a temperature sensor that detects the magnet temperature or from a magnet temperature estimation unit that estimates the magnet temperature based on temperature dependency of an induced voltage of the three-phase synchronous motor,
   acquire a coil temperature of a stator of the three-phase synchronous motor,
   output the current command output from the first current command generation unit to drive the three-phase synchronous motor by outputting a pulse width modulation signal to the power converter,
wherein:
   when the magnet temperature of a rotor of the three-phase synchronous motor exceeds a predetermined temperature and the coil temperature is equal to or less than a predetermined value, output the current command output from the second current command generation unit, the current output being a d-axis current command and a q-axis current command for respectively controlling a d-axis current and a q-axis current in the three-phase synchronous motor to change a ratio of the three-phase AC voltage to the DC voltage such that a voltage absolute value does not fall within a predetermined range, and a harmonic voltage twice a switching frequency of the power converter is reduced.

2. The motor drive device according to claim 1, wherein the current command generation unit outputs a second d-axis current command value and q-axis current command value as the d-axis current command and the q-axis current command when the coil temperature is higher than the predetermined value, the second d-axis current command value and q-axis current command value being smaller in current amplitude than the first d-axis current command value and q-axis current command value.

3. The motor drive device according to claim 1, wherein the current command generation unit outputs a third d-axis current command value and q-axis current command value as the d-axis current command and the q-axis current command without changing an output torque of the three-phase synchronous motor when the coil temperature is higher than the predetermined value and the magnet temperature is higher than the predetermined temperature, the third d-axis current command value and q-axis current command value being larger in current amplitude than the first d-axis current command value and q-axis current command value.

4. The motor drive device according to claim 1, wherein a rotational speed of the three-phase synchronous motor is changed when the magnet temperature is higher than the predetermined temperature.

5. The motor drive device according to claim 1, wherein the DC voltage is changed to a predetermined first DC voltage or less or second DC voltage or more when the magnet temperature is higher than the above.

6. The motor drive device according to claim 1, wherein the current command generation unit outputs a current command to set the AC voltage to a predetermined first AC voltage or less or second AC voltage or more when the magnet temperature is higher than the predetermined temperature.

7. An electromechanical integrated unit comprising:
a structure comprising:
   the motor drive device according to claim 1; and
   a gear that transmits output of the three-phase synchronous motor.

8. A generator system comprising:
the motor drive device according to claim 1; and
an engine system connected to the three-phase synchronous motor.

9. A boost converter system comprising:
the motor drive device according to claim 1; and
a boost converter communicably coupled to the controller that boosts the DC voltage.

10. An electric vehicle system comprising:
the motor drive device according to claim 1, wherein the electric vehicle system travels by using a rotational driving force of the three-phase synchronous motor.

11. A motor drive device comprising:
a three-phase synchronous motor;
a power converter connected to the three-phase motor, the power converter converts a DC voltage into a three-phase AC voltage to drive the three-phase synchronous motor; and
a controller that is connected to the power converter and comprises a current command generation unit comprising a first current command generation unit, a second current command generation unit, and a current command selection unit, the current command generation unit configured to:
   acquire a magnet temperature of a rotor of the three-phase synchronous motor, a coil temperature of a stator of the three-phase synchronous motor, and a module temperature of the power converter,
   select, by the current command selection unit, a current command output calculated in advance from one of the first current command generation unit or the second current command generation unit based on the magnet temperature,
   output the current command output to drive of the three-phase synchronous motor by outputting a pulse width modulation signal to the power converter,
wherein;
   when at least one of the acquired magnet temperature, coil temperature, and module temperature exceeds a predetermined temperature set to each thereof in advance, the output command from the second current command generation unit changes at least one of a current flowing through the three-phase synchronous motor based on the current command output from the second current command generation unit to change a ratio of the three-phase AC voltage to the DC voltage such that a voltage absolute value does not fall within a predetermined range, and a harmonic voltage twice a switching frequency of the power converter is reduced, and a switching frequency of the power converter.

12. The motor drive device according to claim 11, wherein the switching frequency is reduced in a case where the magnet temperature is lower than a predetermined first temperature, the coil temperature is lower than a predetermined second temperature, and the module temperature is higher than a predetermined third temperature.

13. The motor drive device according to claim 12, wherein
the switching frequency is nine times or more a motor fundamental frequency determined by a rotational speed and a number of poles of the three-phase synchronous motor.

14. The motor drive device according to claim 11, wherein:
the current command generation unit is configured to:
output a first current command value as the current command when the coil temperature is equal to or less than a predetermined second temperature, and
output a second current command value smaller in current amplitude than the first current command value as the current command reducing the output torque of the motor more than an input torque command when the coil temperature is higher than the second temperature.

15. The motor drive device according to claim 11, wherein
a d-axis current in the three-phase synchronous motor is controlled based on a ratio of the AC voltage to the DC voltage when the coil temperature is lower than a predetermined second temperature, the module temperature is lower than a predetermined third temperature, and the magnet temperature is higher than a predetermined first temperature.

16. The motor drive device according to claim 11, wherein
a d-axis current in the three-phase synchronous motor is controlled based on a ratio of the AC voltage to the DC voltage and the switching frequency is reduced when the coil temperature is smaller than a predetermined second temperature, the magnet temperature is lower than a predetermined first temperature, and the module temperature is lower than a predetermined third temperature.

17. A motor drive device comprising:
a three-phase synchronous motor;
a power converter connected to the three-phase motor, the power converter converts a DC voltage into a three-phase AC voltage to drive the three-phase synchronous motor; and
a controller that is connected to the power converter and comprises a current command generation unit comprising a first current command generation unit, and a second current command generation unit, the current command generation unit configured to:
acquire a magnet temperature from one of a temperature sensor that detects the magnet temperature or from a magnet temperature estimation unit that estimates the magnet temperature based on temperature dependency of an induced voltage of the three-phase synchronous motor,
output the current command output from the first current command generation unit to drive of the three-phase synchronous motor by outputting a pulse width modulation signal to the power converter,
wherein when a magnet temperature of a rotor of the three-phase synchronous motor exceeds a predetermined temperature, output the current command output from the second current command generation unit, that changes the three-phase AC voltage based on a ratio of the three-phase AC voltage to the DC voltage such that a voltage absolute value does not fall within a predetermined range, and a harmonic voltage twice a switching frequency of the power converter is reduced.

* * * * *